US00RE46565E

(19) United States
(12) Reissued Patent
Tsushima et al.

(10) Patent Number: US RE46,565 E
(45) Date of Reissued Patent: *Oct. 3, 2017

(54) ENCODING DEVICE AND DECODING DEVICE

(71) Applicant: DOLBY INTERNATIONAL AB, Amsterdam Zuidoost (NL)

(72) Inventors: Mineo Tsushima, Kyoto (JP); Takeshi Norimatsu, Hyogo (JP); Kosuke Nishio, Osaka (JP); Naoya Tanaka, Osaka (JP)

(73) Assignee: DOLBY INTERNATIONAL AB, Amsterdam Zuidoost (NL)

( * ) Notice: This patent is subject to a terminal disclaimer.

(21) Appl. No.: 14/300,774

(22) Filed: Jun. 10, 2014

Related U.S. Patent Documents

Reissue of:
(64) Patent No.: 8,108,222
Issued: Jan. 31, 2012
Appl. No.: 12/836,900
Filed: Jul. 15, 2010

U.S. Applications:
(60) Continuation of application No. 14/057,478, filed on Oct. 18, 2013, now Pat. No. Re. 45,042, which is a (Continued)

(30) Foreign Application Priority Data

Nov. 14, 2001 (JP) ..... 2001-348412

(51) Int. Cl.
*G10L 21/038* (2013.01)
*G10L 19/02* (2013.01)

(52) U.S. Cl.
CPC ..... *G10L 21/038* (2013.01); *G10L 19/0208* (2013.01); *G10L 19/0212* (2013.01)

(58) Field of Classification Search
None
See application file for complete search history.

(56) References Cited

U.S. PATENT DOCUMENTS 5,394,473 A * 2/1995 Davidson ..... G10L 19/0212 375/240
5,473,727 A 12/1995 Nishiguchi et al.
(Continued)

FOREIGN PATENT DOCUMENTS

EP 0 600 504 6/1994
EP 0 805 435 11/1997
(Continued)

OTHER PUBLICATIONS

M. Bosi et al., ISO/IEC JTC1/SC29/WG11 N1650, entitled "Coding of Moving Pictures and Audio", IS 13817- 7 (MPEG-2 Advanced Audio Coding, AAC), Apr. 1997.
(Continued)

*Primary Examiner* — Mary Steelman
(74) *Attorney, Agent, or Firm* — Wenderoth, Lind & Ponack, L.L.P.

(57) ABSTRACT

An encoding device (200) includes an MDCT unit (202) that transforms an input signal in a time domain into a frequency spectrum including a lower frequency spectrum, a BWE encoding unit (204) that generates extension data which specifies a higher frequency spectrum at a higher frequency than the lower frequency spectrum, and an encoded data stream generating unit (205) that encodes to output the lower frequency spectrum obtained by the MDCT unit (202) and the extension data obtained by the BWE encoding unit (204). The BWE encoding unit (204) generates as the extension data (i) a first parameter which specifies a lower subband which is to be copied as the higher frequency spectrum from among a plurality of the lower subbands which form the lower frequency spectrum obtained by the MDCT unit (202) and (ii) a second parameter which specifies a gain of the lower subband after being copied.

2 Claims, 13 Drawing Sheets

Related U.S. Application Data continuation of application No. 13/675,655, filed on Nov. 13, 2012, now Pat. No. Re. 44,600, which is an application for the reissue of Pat. No. 8,108,222, which is a division of application No. 12/370,203, filed on Feb. 12, 2009, now Pat. No. 7,783,496, which is a division of application No. 11/508,915, filed on Aug. 24, 2006, now Pat. No. 7,509,254, which is a division of application No. 10/292,702, filed on Nov. 13, 2002, now Pat. No. 7,139,702.

(56) References Cited

U.S. PATENT DOCUMENTS

| | | | | |
|---|---|---|---|---|
| 5,530,750 | A | 6/1996 | Akagiri | |
| 5,677,994 | A | 10/1997 | Miyamori et al. | |
| 6,226,616 | B1 * | 5/2001 | You et al. | 704/500 |
| 6,240,385 | B1 | 5/2001 | Foodeei | |
| 6,606,600 | B1 | 8/2003 | Murgia | G10L 19/0208 704/205 |
| 6,680,972 | B1 | 1/2004 | Liljeryd et al. | |
| 6,711,538 | B1 | 3/2004 | Omori et al. | |
| 7,139,702 | B2 | 11/2006 | Tsushima et al. | |
| 7,283,967 | B2 | 10/2007 | Nishio et al. | |
| 7,328,160 | B2 | 2/2008 | Nishio et al. | |
| 7,373,296 | B2 | 5/2008 | Van De Par et al. | |
| 7,392,176 | B2 | 6/2008 | Nishio et al. | |
| 7,509,254 | B2 | 3/2009 | Tsushima et al. | |
| 2002/0038216 | A1 * | 3/2002 | Suzuki | G10L 19/0208 704/500 |
| 2002/0156619 | A1 | 10/2002 | Van De Kerkhof et al. | |
| 2002/0169601 | A1 | 11/2002 | Nishio et al. | |
| 2004/0162721 | A1 | 8/2004 | Oomen et al. | |
| 2006/0227018 | A1 * | 10/2006 | Ejima et al. | 341/50 |
| 2008/0215322 | A1 * | 9/2008 | Fischer et al. | 704/243 |

FOREIGN PATENT DOCUMENTS

| | | |
|---|---|---|
| EP | 1 037 196 | 9/2000 |
| JP | 9-90992 | 4/1997 |
| JP | 9-258787 | 10/1997 |
| JP | 2001-100773 | 4/2001 |
| JP | 2001-521648 | 11/2001 |
| WO | 98/57436 | 12/1998 |
| WO | 00/45379 | 8/2000 |
| WO | 00/79520 | 12/2000 |

OTHER PUBLICATIONS

Alan McCree, "A 14 KB/S Wideband Speech Coder With a Parametric Highband Model", International Conference on Acoustics, Speech and Signal Processing, Jun. 5-9, 2000.

R. Taori et al., "HI-BIN: An Alternative Approach To Wideband Speech Coding", IEEE International Conference on Acoustics, Speech and Signal Processing (ICASSP) Jun. 5-9, 2000.

International Search Report issued Aug. 4, 2003 in International Application No. PCT/JP02/11605.

* cited by examiner

1 FRAME DATA (1)
1 FRAME DATA (2)
1 FRAME DATA (3)

STREAM 1

STREAM 2
WHETHER SAME OR NOT AS THE LAST FRAME
1 BIT
A
2 BITS
h0
g0
4 BITS

C
2 BITS
h1
g1
4 BITS
A
2 BITS
h2
g2
4 BITS
D
2 BITS
h7
g7
4 BITS endline
shiftlen
A B C D
E F G
h0 h1 h2 h3 h4 h5 h6 h7
startline
maxline
sbw
targetline
0
2047

A
A=(p0,p1,...,pN)

As
As=(pN,p(N-1),...,p0)

Ar
Ar=(-p0,-p1,...,-pN)

(1)
2047
targetline
sbw
maxline
startline
shiftlen
h0 h1 h2 h3 h4 h5 h6 h7
A B C D
E F G
0

(2)
2047
sbw
maxline
startline
shiftlen
h0 h1 h2 h3 h4 h5 h6 h7
A B C D
E F G
0

(3)
2047
sbw
maxline
startline
shiftlen
h0 h1 h2 h3 h4 h5 h6 h7
A B C D
E F G
0
t0
t1
t2
t (1)
2047
targetline
maxline
0
G0

(2)
2047
targetline
maxline
0
G1

(3)
2047
targetline
maxline
0
G2
t0
t1
t2
t

ENCODING DEVICE AND DECODING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a continuation reissue of application Ser. No. 14/057,478, filed Oct. 18, 2013, now U.S. Pat. No. Re. 45,042, which is a continuation reissue of application Ser. No. 13/675,655, filed Nov. 13, 2012, now U.S. Pat. No. Re. 44,600, which is an application for reissue of U.S. Pat. No. 8,108,222, which issued on Jan. 31, 2012 from application Ser. No. 12/836,900, which* is a divisional of application Ser. No. 12/370,203, filed Feb. 12, 2009 now U.S. Pat. No. 7,783,496, which is a divisional of application Ser. No. 11/508,915, filed Aug. 24, 2006, now U.S. Pat. No. 7,509,254, which is a divisional of application Ser. No. 10/292,702, filed Nov. 13, 2002, now U.S. Pat. No. 7,139,702.

TECHNICAL FIELD

The present invention relates to an encoding device that compresses data by encoding a signal obtained by transforming an audio signal, such as a sound or a music signal, in the time domain into that in the frequency domain, with a smaller amount of encoded bit stream using a method such as an orthogonal transform, and a decoding device that decompresses data upon receipt of the encoded data stream.

BACKGROUND ART

A great many methods of encoding and decoding an audio signal have been developed up to now. Particularly, in these days, IS13818-7 which is internationally standardized in ISO/IEC is publicly known and highly appreciated as an encoding method for reproduction of high quality sound with high efficiency. This encoding method is called AAC. In recent years, the AAC is adopted to the standard called MPEG4, and a system called MPEG4-AAC that has some extended functions added to the IS13818-7 is developed. An example of the encoding procedure is described in the informative part of the MPEG4-AAC.

Following is an explanation for the audio encoding device using the conventional method referring to FIG. 1. FIG. 1 is a block diagram that shows a structure of the conventional encoding device 100. The encoding device 100 includes a spectrum amplifying unit 101, a spectrum quantizing unit 102, a Huffman coding unit 103 and an encoded data stream transfer unit 104. An audio discrete signal stream in the time domain obtained by sampling an analog audio signal at a fixed frequency is divided into a fixed number of samples at a fixed time interval, transformed into data in the frequency domain via a time-frequency transforming unit not shown here, and then sent to the spectrum amplifying unit 101 as an input signal to the encoding device 100. The spectrum amplifying unit 101 amplifies spectrums included in a predetermined band with one certain gain for each of the predetermined band. The spectrum quantizing unit 102 quantizes the amplified spectrums with a predetermined conversion expression. In the case of AAC method, the quantization is conducted by rounding off frequency spectral data which is expressed with a floating point into an integer value. The Huffman coding unit 103 encodes the quantized spectral data in groups of certain pieces according to the Huffman coding, and encodes the gain in every predetermined band in the spectrum amplifying unit 101 and data that specifies a conversion expression for the quantization according to the Huffman coding, and then sends the codes of them to the encoded data stream transfer unit 104. The encoded data stream that is encoded according to the Huffman coding is transferred from the encoded data stream transfer unit 104 to a decoding device via a transmission channel or a recording medium, and is reconstructed into an audio signal in the time domain by the decoding device. The conventional encoding device operates as described above.

In the conventional encoding device 100, compression capability for data amount is dependent on the performance of the Huffman coding unit 103, so, when the encoding is conducted at a high compression rate, that is, with a small amount of data, it is necessary to reduce the gain sufficiently in the spectrum amplifying unit 101 and encode the quantized spectral stream obtained by the spectrum quantizing unit 102 so that the data becomes a smaller size in the Huffman coding unit 103. However, if the encoding is conducted for reducing the data amount according to this method, the bandwidth for reproduction of sound and music becomes narrow. So it cannot be denied that the sound would be furry when it is heard. As a result, it is impossible to maintain the sound quality. That is a problem.

The object of the present invention is, in the light of the above-mentioned problem, to provide an encoding device that can encode an audio signal with a high compression rate and a decoding device that can decode the encoded audio signal and reproduce wideband frequency spectral data and wideband audio signal.

DISCLOSURE OF INVENTION

In order to solve the above problem, the encoding device according to the present invention is an encoding device that encodes an input signal including: a time-frequency transforming unit operable to transform an input signal in a time domain into a frequency spectrum including a lower frequency spectrum; a band extending unit operable to generate extension data which specifies a higher frequency spectrum at a higher frequency than the lower frequency spectrum; and an encoding unit operable to encode the lower frequency spectrum and the extension data, and output the encoded lower frequency spectrum and extension data, wherein the band extending unit generates a first parameter and a second parameter as the extension data, the first parameter specifying a partial spectrum which is to be copied as the higher frequency spectrum from among a plurality of the partial spectrums which form the lower frequency spectrum, and the second parameter specifying a gain of the partial spectrum after being copied.

As described above, the encoding device of the present invention makes it possible to provide an audio encoded data stream in a wide band at a low bit rate. As for the lower frequency components, the encoding device of the present invention encodes the spectrum thereof using a compression technology such as Huffman coding method. On the other hand, as for the higher frequency components, it does not encode the spectrum thereof but mainly encodes only the data for copying the lower frequency spectrum which substitutes for the higher frequency spectrum. Therefore, there is an effect that the data amount which is consumed by the encoded data stream representing the higher frequency components can be reduced.

Also, the decoding device of the present invention is a decoding device that decodes an encoded signal, wherein the encoded signal includes a lower frequency spectrum and extension data, the extension data including a first parameter and a second parameter which specify a higher frequency spectrum at a higher frequency than the lower frequency spectrum, the decoding device includes: a decoding unit operable to generate the lower frequency spectrum and the extension data by decoding the encoded signal; a band extending unit operable to generate the higher frequency spectrum from the lower frequency spectrum and the first parameter and the second parameter; and a frequency-time transforming unit operable to transform a frequency spectrum obtained by combining the generated higher frequency spectrum and the lower frequency spectrum into a signal in a time domain, and the band extending unit copies a partial spectrum specified by the first parameter from among a plurality of partial spectrums which form the lower frequency spectrum, determines a gain of the partial spectrum after being copied, according to the second parameter, and generates the obtained partial spectrum as the higher frequency spectrum.

According to the decoding device of the present invention, since the higher frequency components is generated by adding some manipulation such as gain adjustment to the copy of the lower frequency components, there is an effect that wideband sound can be reproduced from the encoded data stream with a small amount of data.

Also, the band extending unit may add a noise spectrum to the generated higher frequency spectrum, and the frequency-time transforming unit may transform a frequency spectrum obtained by combining the higher frequency spectrum with the noise spectrum being added and the lower frequency spectrum into a signal in the time domain.

According to the decoding device of the present invention, since the gain adjustment is performed on the copied lower frequency components by adding noise spectrum to the higher frequency spectrum, there is an effect that the frequency band can be widened without extremely increasing the tonality of the higher frequency spectrum.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings.

BEST MODE FOR CARRYING OUT THE INVENTION

The following is an explanation of the encoding device and the decoding device according to the embodiments of the present invention with reference to figures (FIG. 2~FIG. 13).

The First Embodiment

Figure 1:
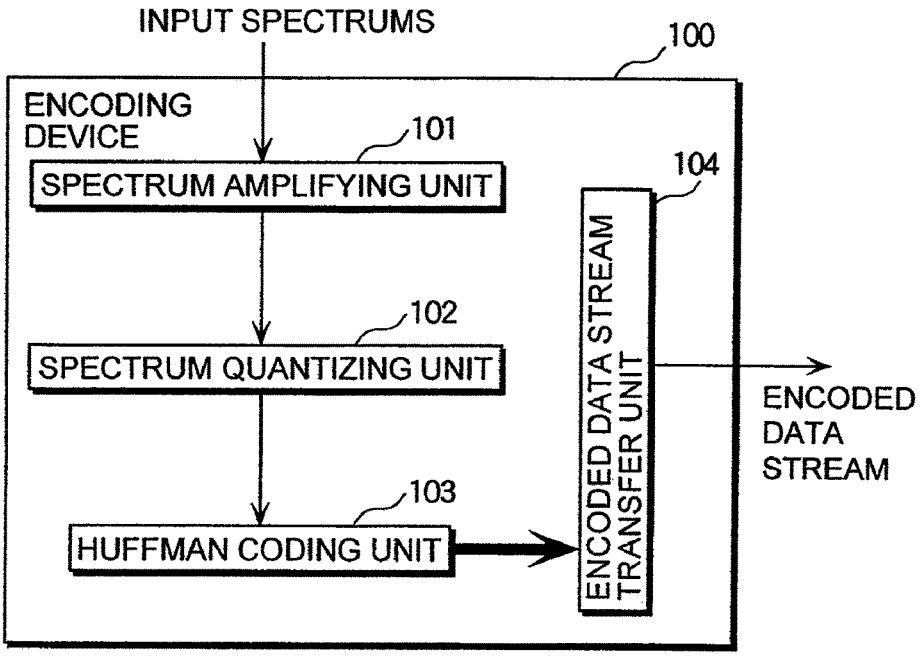
FIG. 1 is a block diagram showing a structure of the conventional encoding device.
Figure 2:
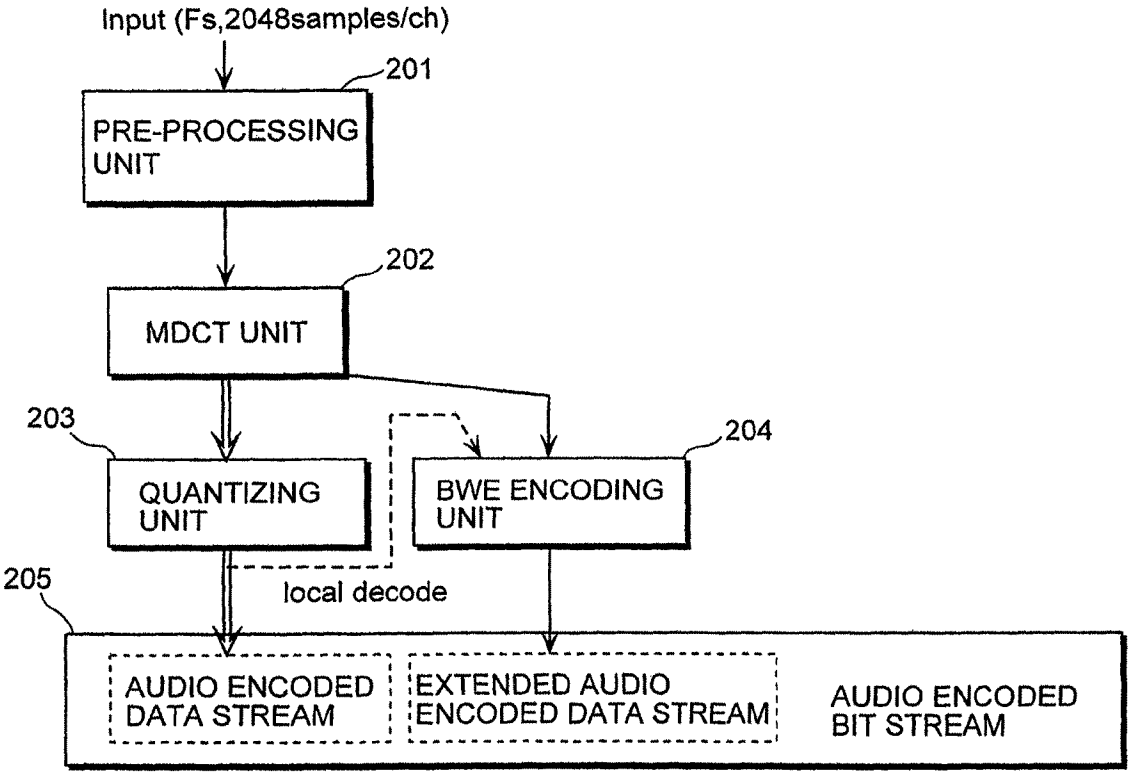
FIG. 2 is a block diagram showing a structure of the encoding device according to the first embodiment of the present embodiment.

First, the encoding device will be explained. FIG. 2 is a block diagram showing a structure of the encoding device 200 according to the first embodiment of the present embodiment. The encoding device 200 is a device that divides the lower band spectrum into subbands in a fixed frequency bandwidth and outputs an audio encoded bit stream with data for specifying the subband to be copied to the higher frequency band included therein. The encoding device 200 includes a pre-processing unit 201, an MDCT unit 202, a quantizing unit 203, a BWE encoding unit 204 and an encoded data stream generating unit 205. The pre-processing unit 201, in consideration of change of sound quality due to quantization distortion with encoding and/or decoding, determines whether the input audio signal should be quantized in every frame smaller than 2,048 samples (SHORT window) giving a higher priority to time resolution or it should be quantized in every 2,048 samples (LONG window) as it is. The MDCT unit 202 transforms audio discrete signal stream in the time domain outputted from the pre-processing unit 201 with Modified Discrete Cosine Transform (MDCT), and outputs the frequency spectrum in the frequency domain. The quantizing unit 203 quantizes the lower frequency band of the frequency spectrum outputted from the MDCT unit 202, encodes it with Huffman coding, and then outputs it. The BWE encoding unit 204, upon receipt of an MDCT coefficient obtained by the MDCT unit 202, divides the lower band spectrum out of the received spectrum into subbands with a fixed frequency bandwidth, and specifies the lower subband to be copied to the higher frequency band substituting for the higher band spectrum based on the higher band frequency spectrum outputted from the MDCT unit 202. The BWE encoding unit 204 generates the extended frequency spectral data indicating the specified lower subband for every higher subband, quantizes the generated extended frequency spectral data if necessary, and encodes it with Huffman coding to output extended audio encoded data stream. The encoded data stream generating unit 205 records the lower band audio encoded data stream outputted from the quantizing unit 203 and the extended audio encoded data stream outputted from the BWE encoding unit 204, respectively, in the audio encoded data stream section and the extended audio encoded data stream section of the audio encoded bit stream defined under the AAC standard, and outputs them outside.

Operation of the above-structured encoding device 200 will be explained below. First, a audio discrete signal stream which is sampled at a sampling frequency of 44.1 kHz, for instance, is inputted into the pre-processing unit 201 in every frame including 2,048 samples. The audio signal in one frame is not limited to 2,048 samples, but the following explanation will be made taking the case of 2,048 samples as an example, for easy explanation of the decoding device which will be described later. The pre-processing unit 201 determines whether the inputted audio signal should be encoded in a LONG window or in a SHORT window, based on the inputted audio signal. It will be described below the case when the pre-processing unit 201 determines that the audio signal should be encoded in a LONG window.

The audio discrete signal stream outputted from the pre-processing unit 201 is transformed from a discrete signal in the time domain into frequency spectral data at fixed intervals and then outputted. MDCT is common as time-frequency transformation. As the interval, any of 128, 256, 512, 1,024 and 2,048 samples is used. In MDCT, the number of samples of discrete signal in the time domain may be same as that of samples of the transformed frequency spectral data. MDCT is well known to those skilled in the art. Here, the explanation will be made on the assumption that the audio signal of 2,048 samples outputted from the pre-processing unit 201 are inputted to the MDCT unit 202 and performed MDCT. Also, the MDCT unit 202 performs. MDCT on them using the past frame (2,048 samples) and newly inputted frame (2,048 samples), and outputs the MDCT coefficients of 2,048 samples. MDCT is generally given by an expression 1 and so on.

$$Xi,k = 2\sum_{n=0}^{N-1} Zi,n\cos\left(\frac{2\pi}{N}(n+n0)\left(k+\frac{1}{2}\right)\right) \qquad \text{Expression 1}$$

Zi,n: input audio sample windowed
n: sample index
k: index of MDCT coefficient
i: frame number
N: window length
n0=(N/2+1)/2

Generally, in the encoding process, the frequency spectral data obtained as above is represented by codes completely reversible or non-reversible, such as Huffman coding, corresponding to data compression so as to generate encoded data stream. Here, the lower band MDCT coefficients from 0th~1, 023th, a half of the MDCT coefficients of 2,048 samples which are aligned in frequency order from the lower frequency components to the higher frequency components, are inputted to the quantizing unit 203. The quantizing unit 203 quantizes the inputted MDCT coefficients using a quantization method such as AAC, and generates the lower band audio encoded data stream. Generally in the quantization method like AAC, the number of MDCT coefficients to be quantized is not defined. Therefore, the quantizing unit 203 may quantize all the lower band MDCT coefficients inputted (1,024 coefficients), or a part of them. Here, the quantizing unit 203 quantizes and encodes "maxline" pieces of coefficients from 0th~(maxline−1)th out of the MDCT coefficients. Here, "maxline" is an upper limit of frequency for the MDCT coefficients which are to be quantized and encoded by the conventional encoding device. Meanwhile, all the MDCT coefficients (2,048 coefficients) outputted from the MDCT unit 202 are inputted to the BWE encoding unit 204.

Figures 3A, 3B, 3C:
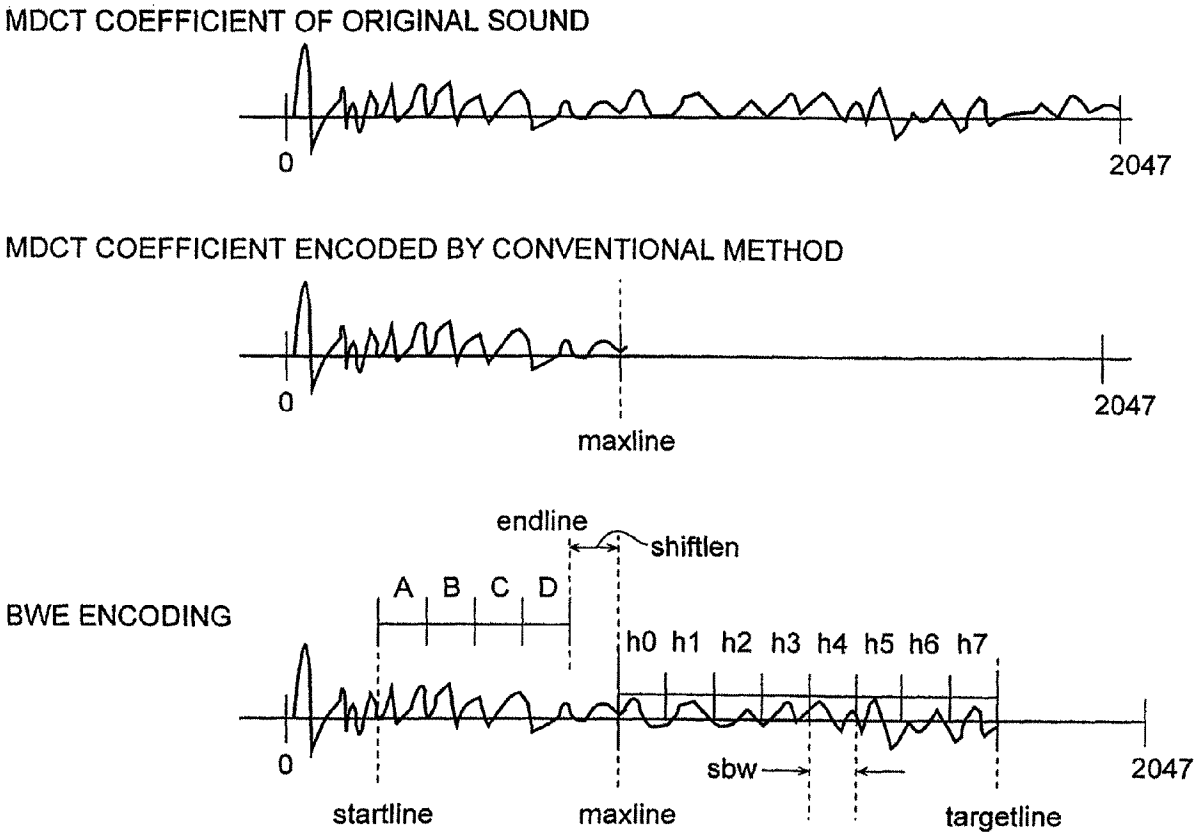
FIG. 3A is a diagram showing a series of MDCT coefficients outputted by an MDCT unit.
FIG. 3B is a diagram showing the 0th~(maxline−1)th MDCT coefficients out of the MDCT coefficients shown in FIG. 3A.
FIG. 3C is a diagram showing an example of how to generate an extended audio encoded data stream in a BWE encoding unit shown in FIG. 2.

The processing for generating the extended audio encoded data stream in the BWE encoding unit 204 shown in FIG. 2 will be explained in more detail with reference to FIG. 3A~3C. FIG. 3A is a diagram showing a series of MDCT coefficients outputted by the MDCT unit 202. FIG. 3B is a diagram showing the 0th~(maxline−1)th MDCT coefficients which are encoded by the quantizing unit 203, out of the MDCT coefficients shown in FIG. 3A. FIG. 3C is a diagram showing an example of how to generate an extended audio encoded data stream in the BWE encoding unit 204 shown in FIG. 2. In FIGS. 3A~3C, the horizontal axis indicates frequencies, and the numbers, 0~2,047, are assigned to the MDCT coefficients from the lower to the higher frequency. The vertical axis indicates values of the MDCT coefficients. In these figures, the frequency spectrums are represented by continuous waveforms in the frequency direction. However, they are not continuous waveforms but discrete spectrums. As shown in FIG. 3A, 2,048 MDCT coefficients outputted from the MDCT unit 202 can represent the original sound sampled for a fixed time period in a half width of the frequency band of the sampling frequency at the maximum bandwidth. Generally in the conventional encoding device, it is often the case that only the lower band MDCT coefficients which are important for hearing, up to the "maxline", for instance, are quantized and encoded, out of the MDCT coefficients shown in FIG. 3A, and transmitted to the decoding device. Therefore, the BWE encoding unit 204 generates the extended frequency spectral data representing the higher band MDCT coefficients of the "maxline" or more substituting for the higher band MDCT coefficients themselves shown in FIG. 3A. In other words, the BWE encoding unit 204 aims at encoding the (maxline)th~(targetline−1)th MDCT coefficients as shown in FIG. 3C, because the coefficients of the $0^{th}$~(maxline−1)th are encoded in advance by the quantizing unit 203.

First, the BWE encoding unit 204 assumes the range in the higher frequency band (specifically, the frequency range from the "maxline" to the "targetline") in which the data should be reproduced as an audio signal in the decoding device, and divides the assumed range into subbands with a fixed frequency bandwidth. Further, the BWE encoding unit 204 divides all or a part of the lower frequency band including the 0th~(maxline−1)th MDCT coefficients out of the inputted MDCT coefficients, and specifies the lower subbands which can substitute for the respective higher subbands including the (maxline)th~2,047th MDCT coefficients. As the lower subband which can substitute for each higher subband, the lower subband whose differential of energy from that of the higher subband is minimum is specified. Or, the lower subband in which the position in the frequency domain of the MDCT coefficient whose absolute value is the peak is closest to the position of the higher band MDCT coefficient may be specified.

In the case of the BWE encoding unit 204 shown in FIG. 3C, it is assumed that there is the following relationship (Expression 2) between "startline", "targetline", "endline" and "sbw" representing the numbers of the MDCT coefficients.

$$\text{endline}=\text{maxline}-\text{shiftlen}$$

$$\text{startline}=\text{endline}-W\cdot\text{sbw}$$

$$\text{targetline}=\text{maxline}+V\cdot\text{sbw}$$

W: 4, for instance

V: 8, for instance — Expression 2

Here, "shiftlen" may be a predetermined value, or it may be calculated depending upon the inputted MDCT coefficient and the data indicating the value may be encoded in the BWE encoding unit 204.

FIG. 3C shows the case, when the higher frequency band is divided into 8 subbands, that is, MDCT coefficients h0~h7, respectively with the frequency width including "sbw" pieces of MDCT coefficient samples, the lower frequency band can have 4 MDCT coefficient subbands A, B, C and D, respectively with "sbw" pieces of samples. In this case, the range between the "startline" and the "endline" is divided into 4 subbands and the range between the "maxline" and the "targetline" is divided into 8 subbands for convenience, but the number of subbands and the number of samples in one subband are not always limited to those. The BWE encoding unit 204 specifies and encodes the lower subbands A, B, C and D with the frequency width "sbw", which substitute for the MDCT coefficients in the higher subbands h0~h7 with the same frequency width "sbw". Here, the "substitution" means that a part of the obtained MDCT coefficients, the MDCT coefficients of the lower subbands A~D in this case, are copied as the MDCT coefficients in the higher subbands h0~h7. The substitution may include the case when the gain control is exercised on the substituted MDCT coefficients.

In the case of the BWE encoding unit 204, the data amount required for representing the lower subband which is substituted for the higher subband is 2 bits at most for each higher subband h0~h7, because it meets the needs if one of the 4 lower subbands A~D can be specified for each higher subband. As described above, the BWE encoding unit 204 encodes the extended frequency spectral data indicating which lower subband A~D substitutes for the higher subband h0~h7, and generates the extended audio encoded data stream with the encoded data stream of that lower subband.

Figures 4A, 4B, 4C:
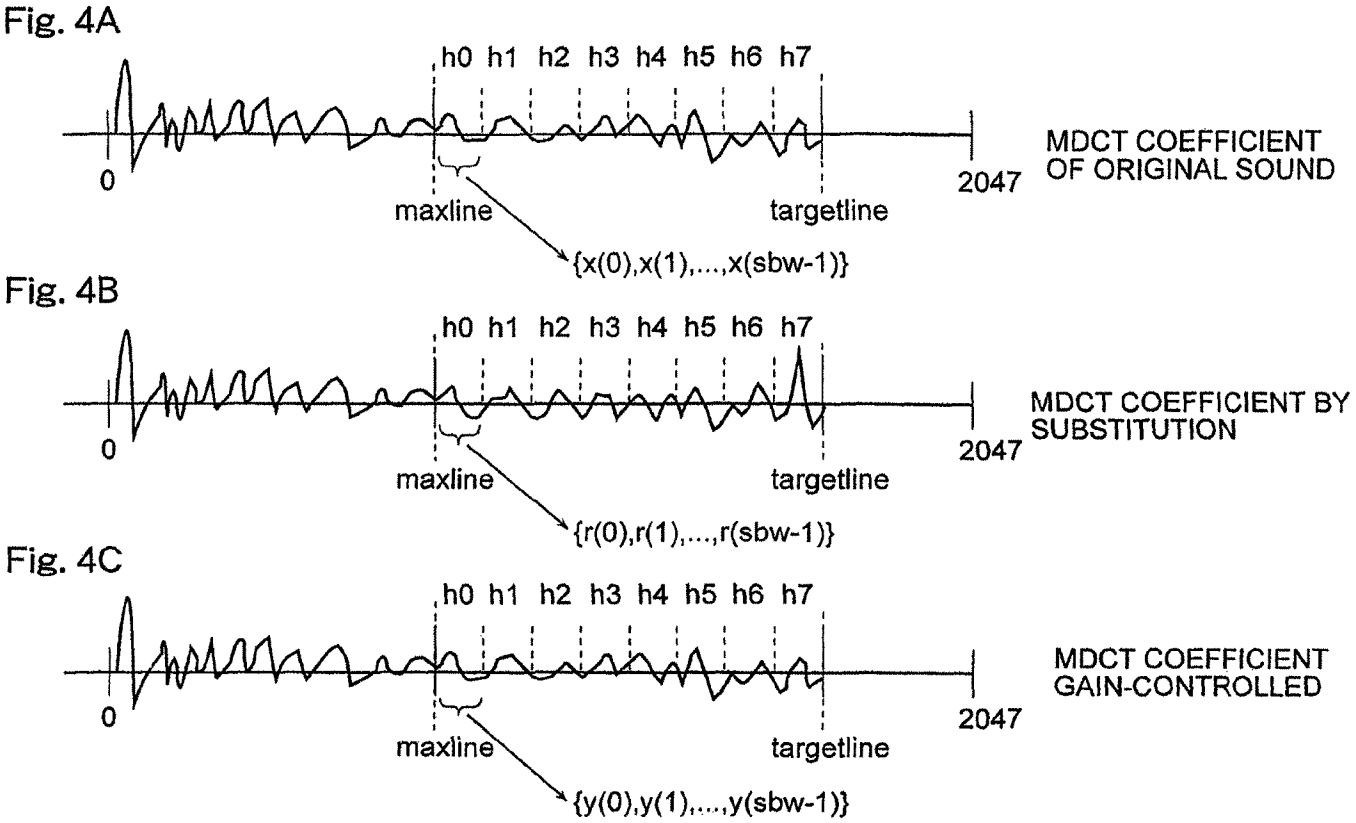
FIG. 4A is a waveform diagram showing a series of MDCT coefficients of an original sound.
FIG. 4B is a waveform diagram showing a series of MDCT coefficients generated by the substitution by the BWE encoding unit.
FIG. 4C is a waveform diagram showing a series of MDCT coefficients generated when gain control is given on a series of the MDCT coefficients shown in FIG. 4B.

Furthermore, the BWE encoding unit 204 adjusts the amplitude of the generated extended audio encoded data stream. FIG. 4A is a waveform diagram showing a series of MDCT coefficients of an original sound. FIG. 4B is a waveform diagram showing a series of MDCT coefficients generated by the substitution by the BWE encoding unit 204. FIG. 4C is a waveform diagram showing a series of MDCT coefficients generated when gain control is given on a series of the MDCT coefficients shown in FIG. 4B. As shown in FIG. 4A, the BWE encoding unit 204 divides the higher band MDCT coefficients from the "maxline" to the "targetline" into a plurality of bands, and encodes the gain data for every band. The band from the "maxline" to the "targetline" may be divided for encoding the gain data by the same method as the higher subbands h0~h7 shown in FIG. 3, or by other methods. Here, the case when the same dividing method is used will be explained with reference to FIG. 4.

The MDCT coefficients of the original sound included in the higher subband h0 are x(0), x(1), . . . , x(sbw−1) as shown in FIG. 4A, and the MDCT coefficients in the higher subband h0 obtained by the substitution are r(0), r(1), . . . , r(sbw−1) as shown in FIG. 4B, and the MDCT coefficients in the subband h0 in FIG. 4C are y(0), y(1), . . . , y(sbw−1). And the gain g0 is obtained for the array x, r and y by the following expression 3, and then encoded.

$$g0=\sqrt{\frac{\Sigma x\cdot x}{\Sigma r\cdot r}} \qquad \text{Expression 3}$$

As for the higher subbands h1~h7, the gain data is calculated and encoded in the same way as above. These gain data g0~g7 are also encoded with a predetermined number of bits into the extended audio encoded data stream.

Figures 5A, 5B, 5C:
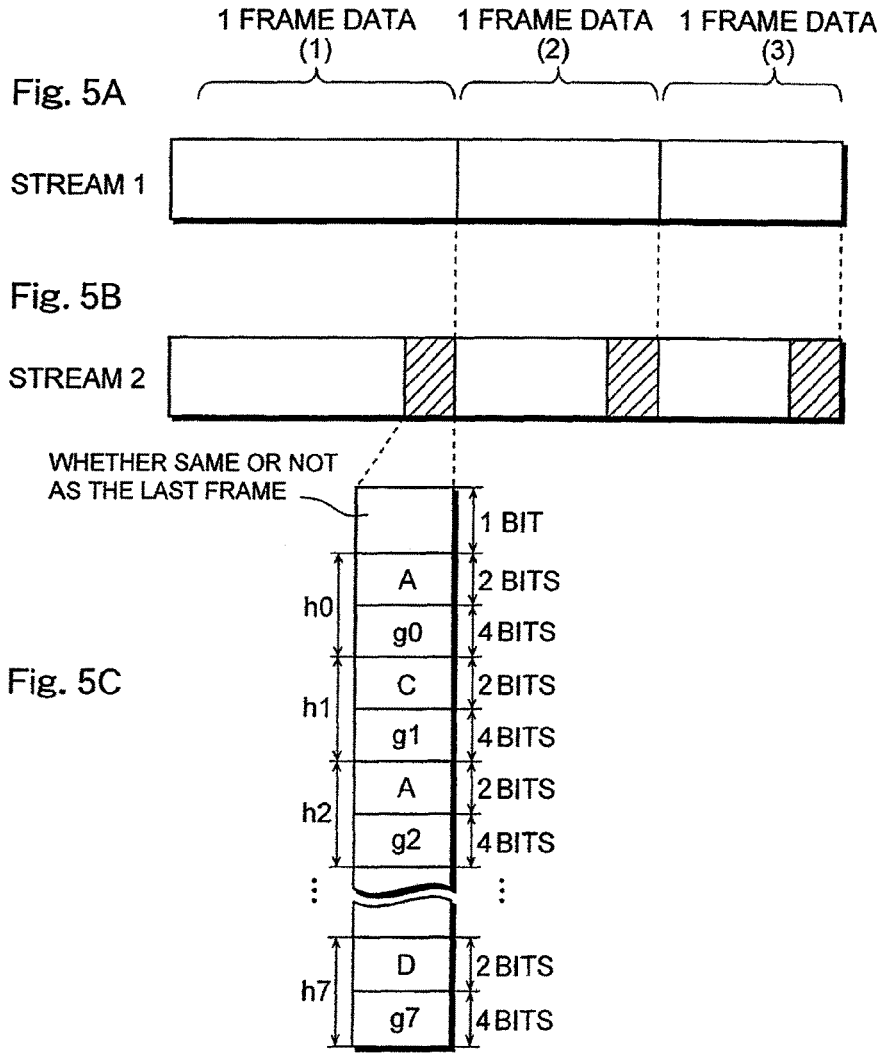
FIG. 5A is a diagram showing an example of a usual audio encoded bit stream.
FIG. 5B is a diagram showing an example of an audio encoded bit stream outputted by the encoding device according to the present embodiment.
FIG. 5C is a diagram showing an example of an extended audio encoded data stream which is described in the extended audio encoded data stream section shown in FIG. 5B.

The extended audio encoded data stream which is encoded as above is described in the audio encoded bit stream outputted from the encoding device 200, as schematically shown in FIG. 5. FIG. 5A is a diagram showing an example of a usual audio encoded bit stream. FIG. 5B is a diagram showing an example of an audio encoded bit stream outputted by the encoding device 200 according to the present embodiment. FIG. 5C is a diagram showing an example of an extended audio encoded data stream which is described in the extended audio encoded data stream section shown in FIG. 5B. As shown in FIG. 5A, when the audio encoded bit stream is formed in every frame in the stream 1, the encoding device 200 uses a part of each frame (an shaded area, for instance) as an extended audio encoded data stream section in the stream 2 as shown in FIG. 5B. This extended audio encoded data stream section is an area of "data_stream_element" described in MPEG-2 AAC and MPEG-4 AAC. This "data_stream_element" is a spare area for describing data for extension when the functions of the conventional encoding system are extended, and is not recognized as an audio encoded data stream by the conventional decoding device even if any kind of data is recorded there. Also, "data_stream_element" is an area for padding with meaningless data such as "0" in order to keep the length of the audio encoded data same, an area of Fill Element in MPEG-2 AAC and MPEG-4 AAC, for example. By describing the extended audio encoded data stream in this area in the audio encoded bit stream, there is no noise occurred when reproducing the extended audio encoded data stream as an audio signal even if the audio encoded bit stream of the present invention is decoded by the conventional decoding device, so that the audio signal with the same bandwidth as the conventional one can be reproduced.

Also, as shown in FIG. 5C, in the extended audio encoded data stream, an item indicating whether the lower subbands A~D which are divided by the same method as the extended audio encoded data stream in the last frame are used or not and items indicating the MDCT coefficients for the respective higher subbands h0~h7 are described. In the items indicating the MDCT coefficients for the respective higher subbands h0~h7, the data indicating the specified lower subbands A~D and their gain data are described. In the item indicating whether the lower subbands A~D same as the extended audio encoded data stream in the last frame are used or not, "1" is described when the MDCT coefficients of the higher subbands h0~h7 are substituted using one of the lower subbands which are divided in the same manner as the last frame, and "0" is described otherwise, that is, when they are substituted using one of the lower subbands A~D which are divided in a new method different from the last frame. In the items indicating the specified lower subband out of A~D, the data of 2 bits specifying one of the four lower subbands A~D is described. Also, the gain data is described in 4 bits, for instance. By doing so, the higher band MDCT coefficients for one frame can be represented by the extended audio encoded data stream of 1+8×(2+4)=49 bits when the higher subbands h0~h7 are substituted by the lower subbands A~D which are divided in the same manner as the last frame. Also, in the frame using the lower subbands A~D same as the last frame, the extended audio encoded data stream can be represented by only 1 bit indicating the value "1", for instance.

Accordingly, when the audio signal encoding method according to the encoding device 200 of the present invention is applied to the conventional encoding method, it becomes possible to represent the higher frequency band using extended audio encoded data stream with a small amount of data, and reproduce wideband audio sound with rich sound in the higher frequency band.

Next, the decoding device will be explained.

In the decoding process, an input audio encoded data stream is decoded to obtain frequency spectral data, the frequency spectrum in the frequency domain is transformed into the data in the time domain, and thus audio signal in the time domain is reproduced.

Figure 6:
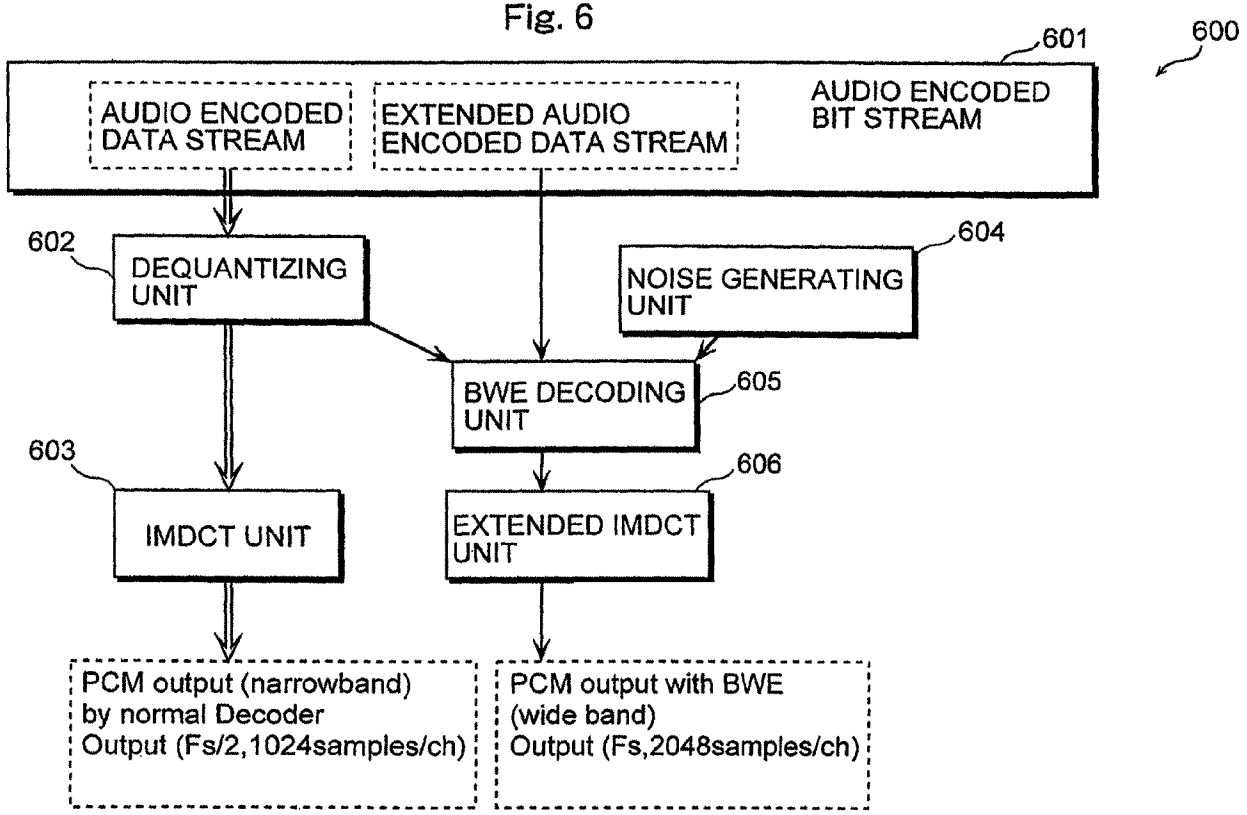
FIG. 6 is a block diagram showing a structure of the decoding device that decodes the audio encoded bit stream outputted from the encoding device shown in FIG. 2.

FIG. 6 is a block diagram showing a structure of a decoding device 600 that decodes the audio encoded bit stream outputted from the encoding device 200 shown in FIG. 2. The decoding device 600 is a decoding device that decodes the audio encoded bit stream including extended audio encoded data stream and outputs the wideband frequency spectral data. It includes an encoded data stream dividing unit 601, a dequantizing unit 602, an IMDCT (Inversed Modified Discrete Cosine Transform) unit 603, a noise generating unit 604, a BWE decoding unit 605 and an extended IMDCT unit 606. The encoded data stream dividing unit 601 divides the inputted audio encoded bit stream into the audio encoded data stream representing the lower frequency band and the extended audio encoded data stream representing the higher frequency band, and outputs the divided audio encoded data stream and extended audio encoded data stream to the dequantizing unit 602 and the BWE decoding unit 605, respectively. The dequantizing unit 602 dequantizes the audio encoded data stream divided from the audio encoded bit stream, and outputs the lower band MDCT coefficients. Note that the dequantizing unit 602 may receive both audio encoded data stream and extended audio encoded data stream. Also, the dequantizing unit 602 reconstructs the MDCT coefficients using the dequantization according to the AAC method if it was used as a quantizing method in the quantizing unit 203. Thereby, the dequantizing unit 602 reconstructs and outputs the 0th~(maxline−1)th lower band MDCT coefficients.

The IMDCT unit 603 performs frequency-time transformation on the lower band MDCT coefficients outputted from the dequantizing unit 602 using IMDCT, and outputs the lower band audio signal in the time domain. Specifically, when the IMDCT unit 603 receives the lower band MDCT coefficients outputted from the dequantizing unit 602, the audio output of 1,024 samples are obtained for each frame. Here, the IMDCT unit 603 performs an IMDCT operation of the 1,024 samples. The expression for the IMDCT operation is generally given by the following expression 4.

$$Xi,\ n = \frac{2}{N}\sum_{k=0}^{N/2-1} \mathrm{spec}[i][k]\cos\left((n+n0)\left(k+\frac{1}{2}\right)\right) \qquad \text{Expression 4}$$

n: sample index
i: window index
k: index of MDCT coefficient
N: window length
n0=(N/2+1)/2

On the other hand, the extended audio encoded data stream divided from the audio encoded bit stream by the encoded data stream dividing unit 601 is outputted to the BWE decoding unit 605. In addition, the 0th~(maxline−1)th lower band MDCT coefficients outputted from the dequantizing unit 602 and the output from the noise generating unit 604 are inputted to the BWE decoding unit 605. Operations of the BWE decoding unit 605 will be explained later in detail. The BWE decoding unit 605 decodes and dequantizes the (maxline)th~2,047th higher band MDCT coefficients based on the extended frequency spectral data obtained by decoding the divided extended audio encoded data stream, and outputs the 0th~2,047th wideband MDCT coefficients by adding the 0th~(maxline−1)th lower band MDCT coefficients obtained by the dequantizing unit 602 to the (maxline)th~2,047th higher band MDCT coefficients. The extended IMDCT unit 606 performs IMDCT operation of the samples twice as many as those performed by the IMDCT unit 603, and then obtains the wideband output audio signal of 2,048 samples for each frame.

Operations of the BWE decoding unit 605 will be explained below in more detail. The BWE decoding unit 605 reconstructs the (maxline)th~(targetline)th MDCT coefficients using the 0th~(maxline−1)th MDCT coefficients obtained by the dequantizing unit 602 and the extended audio encoded data stream. The "startline", "endline", "maxline", "targetline", "sbw" and "shiftlen" are all same values as those used by the BWE encoding unit 204 on the encoding device 200 end. As shown in FIG. SC, the data indicating the lower subbands A~D which substitute for the MDCT coefficients in the higher subbands h0~h7 is encoded in the extended audio encoded data stream. Therefore, based on the data, the MDCT coefficients in the higher subbands h0~h7 are respectively substituted by the specified MDCT coefficients in the lower subbands A~D.

As a result, the BWE decoding unit 605 obtains the 0th~(targetline)th MDCT coefficients. Further, the BWE decoding unit 605 performs gain control based on the gain data in the extended audio encoded data stream. As shown in FIG. 4B, the BWE decoding unit 605 generates a series of the MDCT coefficients which are substituted by the lower subbands A~D in the respective higher subbands h0~17 from the "maxline" to the "targetline". Furthermore, when the substitute MDCT coefficient in the higher subband h0 is r(0), r(1), . . . , r(sbw−1) and the gain data obtained from the extended audio encoded data stream is g0 for the higher subband h0, the BWE decoding unit 605 can obtain a series of the gain-controlled MDCT coefficients as shown in FIG. 4C according to the following relational expression 5. Specifically, when the MDCT coefficient for the higher subband h0 is y(0), y(1), . . . , y(sbw−1), the value of the gain-controlled ith MDCT coefficient y(i) is represented by the following expression 5.

$$yi=g0\cdot ri \qquad \text{Expression 5}$$

In the same manner, the higher subbands h1~h7 can obtain the gain-controlled MDCT coefficients by multiplying the substitute MDCT coefficients by the gain data for the respective higher subbands g1~g7. Furthermore, the noise generating unit 604 generates white noise, pink noise or noise which is a random combination of all or a part of the lower band MDCT coefficients, and adds the generated noise to the gain-controlled MDCT coefficients. At that time, it is possible to correct the energy of the added noise and the spectrum combined with the spectrum copied from the lower frequency band into the energy of the spectrum represented by the expression 5.

In the first embodiment, it has been described about encoding of the gain data which is to be multiplied to the substitute MDCT coefficients according to the expression 5. However, the gain data, which is not relative gain values but absolute values such as the energy or average amplitudes of the MDCT coefficients, may be encoded or decoded.

Using the BWE decoding unit 605 structured as above, wideband audio sound with rich sound particularly in the higher frequency band can be reproduced even if the extended audio encoded data stream represented by a small amount of data is used.

Although the encoding device 200 and the decoding device 600 according to the AAC method have been described, the encoding device and the decoding device of the present invention are not limited to that and any other encoding method may be used.

Also, in the encoding device 200, 0th~2,047th MDCT coefficients are outputted from the MDCT unit 202 to the BWE encoding unit 204. However, the BWE encoding unit 204 may additionally receive the MDCT coefficients including quantization distortion which are obtained by dequantizing the MDCT coefficients quantized by the quantizing unit 203. Also, the BWE encoding unit 204 may receive the MDCT coefficients obtained by dequantizing the output from the quantizing unit 203 for the 0th~(maxline−1)th lower subbands and the output from the MDCT unit 202 for the (maxline)th~(targetline−1)th higher subbands, respectively.

In the first embodiment, it has been described that the extended frequency spectral data is quantized and encoded as the case may be. However, the data to be encoded (extended frequency spectral data) which is represented by a variable-length coding such as Huffman coding may of course be used as extended audio encoded data stream. In response to this encoding, the decoding device does not need to dequantize the extended audio encoded data stream but may decode the variable-length codes such as Huffman codes.

Also, in the first embodiment, it has been described the case when the encoding and decoding methods of the present invention are applied to MPEG-2 AAC and MPEG-4 AAC. However, the present invention is not limited to that, and it may be applied to other encoding methods such as MPEG-1 Audio and MPEG-2 Audio. When MPEG-1 Audio and MPEG-2 Audio are used, the extended audio encoded data stream is applied to "ancillary_data" described in those standards.

In the first embodiment, it has been described that the higher subbands are substituted by the frequency spectrum in the lower subbands within a range of the frequency spectrum (MDCT coefficients) obtained by performing time-frequency transformation on the inputted audio signal. However, the present invention is not limited to that, and the higher subbands may be substituted up to a range beyond the upper limit of the frequency of the frequency spectrum outputted by the time-frequency transformation. In this case, the lower subband used for the substitution cannot be specified based on the higher band frequency spectrum (MDCT coefficients) representing the original sound.

The Second Embodiment

The second embodiment of the present invention is different from the first embodiment in the following. That is, the BWE encoding unit 204 in the first embodiment divides a series of the lower band MDCT coefficients from the "startline" to the "endline" into 4 subbands A~D, while the BWE encoding unit in the second embodiment divides the same bandwidth from the "startline" to the "endline" into 7 subbands A~G with some parts thereof being overlapped. The encoding device and the decoding device in the second embodiment have a basically same structure as the encoding device 200 and the decoding device 600 in the first embodiment, and what is different from the first embodiment is only the processing performed by the BWE encoding unit 701 in the encoding device and the BWE decoding unit 702 in the decoding device. Therefore, in the second embodiment, only the BWE encoding unit 701 and the BWE decoding unit 702 will be explained with modified referential numbers, and other components in the encoding device 200 and the decoding device 600 of the first embodiment which have been already explained are assigned the same referential numbers, and the explanation thereof will be omitted. Also in the following embodiments, only the points different from the aforesaid explanation will be described, and the points same as that will be omitted.

Figure 7:
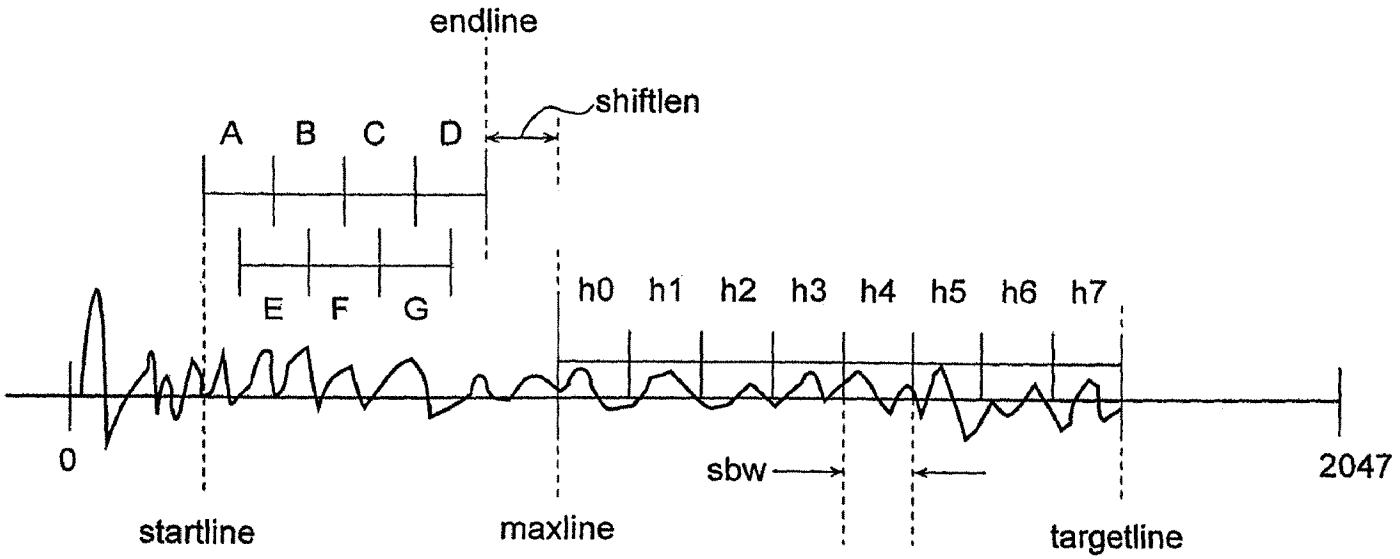
FIG. 7 is a diagram showing how to generate extended frequency spectral data in the BWE encoding unit of the second embodiment.

The BWE encoding unit 701 in the second embodiment will be explained below with reference to FIG. 7. FIG. 7 is a diagram showing how to generate extended frequency spectral data in the BWE encoding unit 701 of the second embodiment. In this figure, the lower subbands E, F and G are subbands obtained by shifting the lower subbands A, B and C, out of the subbands A, B, C and D which are divided in the same manner as those in the first embodiment, in the higher frequency direction by sbw/2. Here, the lower subbands A, B and C are shifted in the higher frequency direction by sbw/2, but a method of dividing the band into subbands with some parts thereof being overlapped, frequency width for shifting the subbands, the number of divided subbands and so on are not always limited to the above ones. The BWE encoding unit 701 generates and encodes the data specifying one of the 7 lower subbands A~G which is substituted for each of the higher subbands h0~h7.

On the other hand, the decoding device of the second to embodiment receives the extended audio encoded data stream which is encoded by the encoding device of the second embodiment (which includes the BWE encoding unit 701 instead of the BWE encoding unit 204 in the encoding device 200), decodes the data specifying the MDCT coefficients in the lower subbands A~G which are substituted for the higher subbands h0~h7, and substitutes the MDCT coefficients in the higher subbands h0~h7 by the MDCT coefficients in the lower subbands A~G.

Assume that the data specifying any one of the lower subbands A~G is represented by code data of 3 bits, for instance. When the integers "0"~"6" as the code data respectively represent the lower subbands A~G, the decoding device may perform the control of making no substitution using any of A~G, if the code data represented by the value "7" is created. Here, the case when the data of 3 bits is used as the code data and the value of the code data is "7" has been described, but the number of bits of the code data and the values of the code data may be other values.

The gain control and/or noise addition which are used in the first embodiment are also used in the second embodiment in the same manner. When the encoding device and the decoding device structured as described above are used, wideband reproduced sound can be obtained using the extended audio encoded data stream with not a large amount of data.

The Third Embodiment

The third embodiment is different from the second embodiment in the following. That is, the BWE encoding unit 701 in the second embodiment divides a series of the lower band MDCT coefficients from the "startline" to the "endline" into 7 subbands A~G with some parts thereof being overlapped, while the BWE encoding unit in the third embodiment divides the same bandwidth from the "startline" to the "endline" into 7 subbands A~G and defines the MDCT coefficients in the lower subbands in the inverted order and the MDCT coefficients in the lower subbands whose positive and negative signs are inverted.

The components of the third embodiment different from the encoding device 200 and the decoding device 600 in the first and second embodiments are only the BWE encoding unit 801 in the encoding device and the BWE decoding unit 802 in the decoding device. The BWE encoding unit in the third embodiment will be explained below with reference to FIG. 8.

Figures 8A, 8B, 8C, 8D:
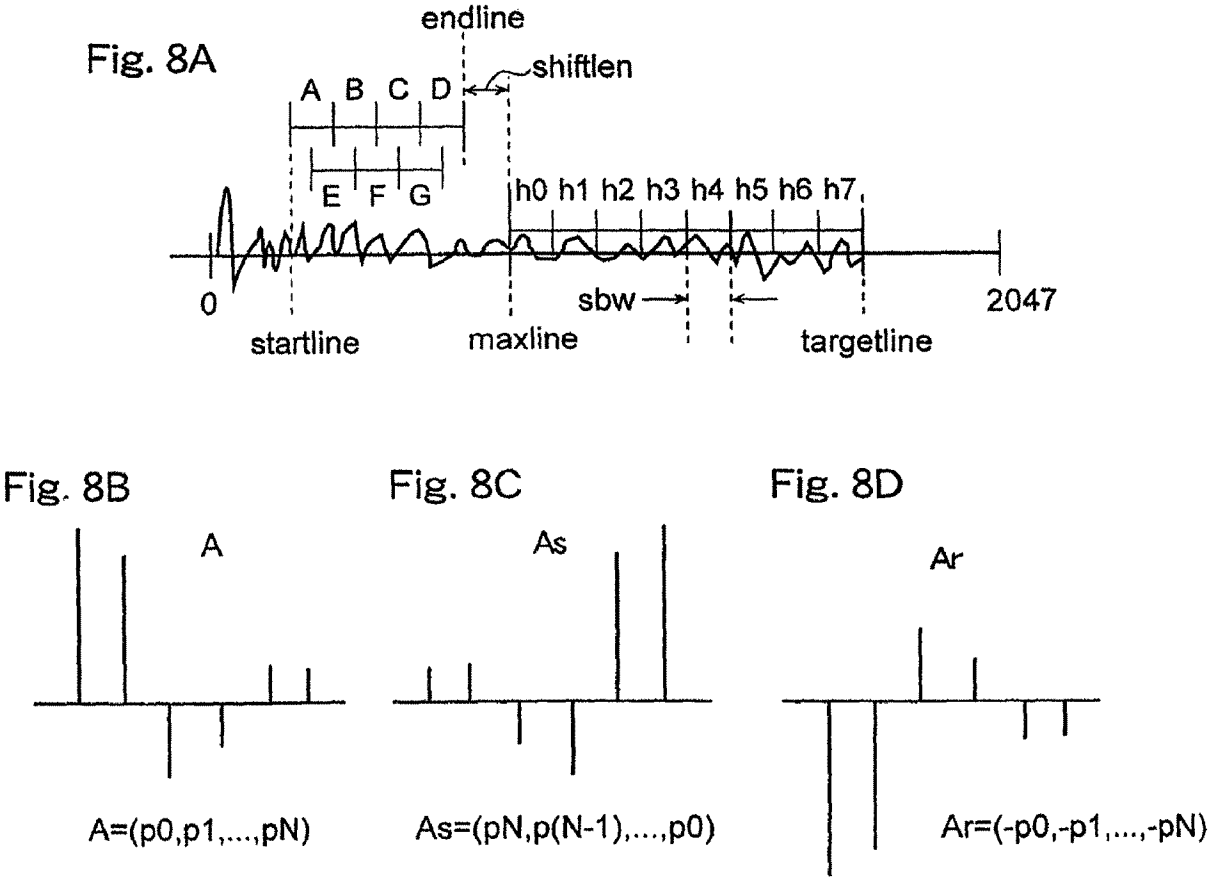
FIG. 8A is a diagram showing lower and higher subbands which are divided in the same manner as the second embodiment.
FIG. 8B is a diagram showing an example of a series of MDCT coefficients in a lower subband A.
FIG. 8C is a diagram showing an example of a series of MDCT coefficients in a sub -band As obtained by inverting the order of the MDCT coefficients in the lower subband A.
FIG. 8D is a diagram showing a subband Ar obtained by inverting the signs of the MDCT coefficients in the lower subband A.

FIG. 8A~D are diagrams showing how the BWE encoding unit 801 in the third embodiment generates the extended frequency spectral data. FIG. 8A is a diagram showing lower and higher subbands which are divided in the same manner as the second embodiment. FIG. 8B is a diagram showing an example of a series of the MDCT coefficients in the lower subband A. FIG. 8C is a diagram showing an example of a series of the MDCT coefficients in the subband As obtained by inverting the order of the MDCT coefficients in the lower subband A. FIG. 8D is a diagram showing a subband Ar obtained by inverting the signs of the MDCT coefficients in the lower subband A. For example, the MDCT coefficients in the lower subband A are represented by (p0, p1, . . . , pN). In this case, p0 represents the value of the 0th MDCT coefficient in the subband A, for instance. The MDCT coefficients in the subbands As obtained by inverting the order of the MDCT coefficients in the subband A in the frequency direction are (pN, p(n−1), . . . , p0). The MDCT coefficients in the subband Ar obtained by inverting the signs of the MDCT coefficients in the lower subband A are represented by (−p0, −p1, . . . , −pN). Not only for the subband A but also the subbands B the subbands Bs~Gs whose order is inverted and the subbands Br~Gr whose signs are inverted are defined.

As described above, the BWE encoding unit 801 in the third embodiment specifies one subband for substituting for each of the higher subbands h0~h7, that is, any one of the 7 lower subbands A~G, 7 lower subbands As~Gs or 7 lower subbands Ar~Gr which are obtained by inverting the order or the signs of the 7 MDCT coefficients in the lower subbands A~G. The BWE encoding unit 801 encodes the data for representing the higher band MDCT coefficients using the specified lower subband, and generates the extended audio encoded data stream as shown in FIG. 5C. In this case, the BWE encoding unit 801 encodes, for each higher subband, the data specifying the lower subband which substitutes for the higher band MDCT coefficient, the data indicating whether the order of the MDCT coefficients in the specified lower subbands is to be inverted or not, and the data indicating whether the positive and negative signs of the MDCT coefficients in the specified lower subbands are to be inverted or not, as the extended frequency spectral data.

On the other hand, the decoding device in the third embodiment receives the extended audio encoded data stream which is encoded by the encoding device in the third embodiment as mentioned above, and decodes the extended frequency spectral data which indicates which of the MDCT coefficients in the lower subbands A~G substitutes for each of the higher subbands h0~h7, whether the order of the MDCT coefficients is to be inverted or not, and whether the positive and negative signs of the MDCT coefficients are to be inverted or not. Next, according to the decoded extended frequency spectral data, the decoding device generates the MDCT coefficients in the higher subbands h0~h7 by inverting the order or signs of the MDCT coefficients in the specified lower subbands A~G.

Furthermore, the third embodiment includes not only the extension of the order and the positive and negative signs of the MDCT coefficients in the lower subbands, but also the substitution by the filtering-processed MDCT coefficients in the lower subbands. Note that the filtering processing means IIR filtering, FIR filtering, etc., for instance, and the explanation thereof will be omitted because they are well known to those skilled in the art. In this filtering processing, if the filtering coefficients are encoded into the extended audio encoded data stream on the encoding device end, on the decoding device end, the MDCT coefficients in the specified lower subbands are performed IIR filtering or FIR filtering indicated by the decoded filtering coefficients, and the higher subbands can be substituted by the filtering-processed MDCT coefficients. Note that the gain control used in the first embodiment can be used in the third embodiment in the same manner. When the encoding device and the decoding device structured as above are used, wideband reproduced sound can be obtained using the extended audio encoded data stream with not a large amount of data.

The Fourth Embodiment

Figures 9A, 9B, 9C:
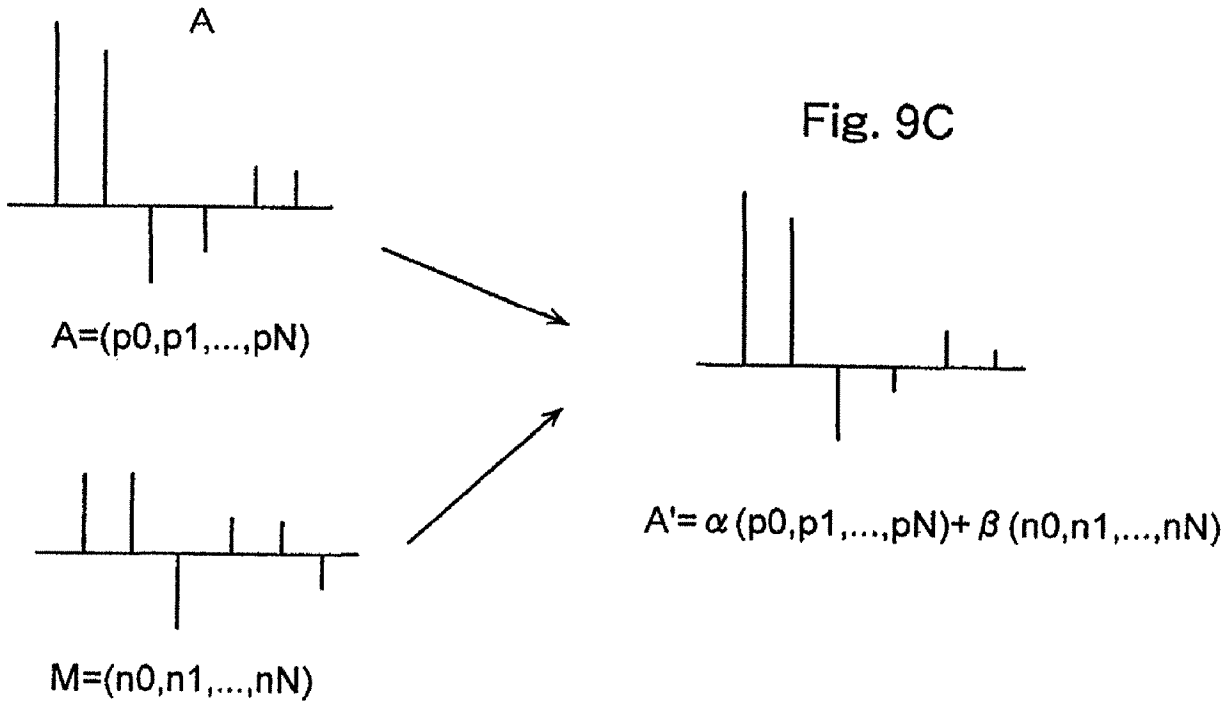
FIG. 9A is a diagram showing an example of the MDCT coefficients in the lower subband A which is specified for a higher subband h0.
FIG. 9B is a diagram showing an example of the same number of MDCT coefficients as those in the lower subband A generated by a noise generating unit.
FIG. 9C is a diagram showing an example of the MDCT coefficients substituting for the higher subband h0, which are generated using the MDCT coefficients in the lower subband A shown in FIG. 9A and the MDCT coefficients generated by the noise generating unit shown in FIG. 9B.

The fourth embodiment is different from the third embodiment in the following. That is, the decoding device in the fourth embodiment does not substitute for the MDCT coefficients in the higher subbands h0~h7 with only the MDCT coefficients in the specified lower subbands A~G, but substitutes for them with the MDCT coefficients generated by the noise generating unit in addition to the MDCT coefficients in the specified lower subbands A~G. Therefore, the components of the decoding device in the fourth embodiment different in structure from the decoding device 600 in the first embodiment are only the noise generating unit 901 and the BWE decoding unit 902. As for the processing of decoding the extended audio encoded data stream in the decoding device in the fourth embodiment, the case when the higher subband h0 which is to be BWE-decoded is substituted by the lower subband A, for example, will be explained below with reference to FIG. 9A~C. FIG. 9A is a diagram showing an example of the MDCT coefficients in the lower subband A which is specified for the higher subband h0. FIG. 9B is a diagram showing an example of the same number of MDCT coefficients as those in the lower subband A generated by the noise generating unit 901. FIG. 9C is a diagram showing an example of the MDCT coefficients substituting for the higher subband h0, which are generated using the MDCT coefficients in the lower subband A shown in FIG. 9A and the MDCT coefficients generated by the noise generating unit 901 shown in FIG. 9B. Here, the MDCT coefficients in the lower subband A is to be A=(p0, p1, . . . , pN). And the same number of the noise signal MDCT coefficients as those in the lower subband A, M=(n0, n1, . . . , nN), are obtained in the noise generating unit 901. The BWE decoding unit 902 adjusts the MDCT coefficients A in the lower subband A and the noise signal MDCT coefficients M using weighting factors α, β, and generates the substitute MDCT coefficients A' which substitute for the MDCT coefficients in the higher subband h0. The substitute coefficients A' are represented by the following expression 6.

$$A'=\alpha(p0,p1,\ldots,pN)+\beta(n0,n1,\ldots,nN) \qquad \text{Expression 6}$$

The weighting factors α, β may be predetermined values in the decoding device in the fourth embodiment, or may be values obtained by encoding the control data indicating the values of the weighting factors α, β into the extended audio encoded data stream in the encoding device and decoding those values in the decoding device.

Here, the subband h0 outputted by the BWE decoding unit 902 has been explained as an example, but the same processing is performed for the other higher subbands h1~h7. Also, the lower subband A has been explained as an example of a lower subband to be substituted, but any other lower subbands obtained by the dequantizing unit and the processing for them is same. As for the weighting factors α, β, they may be values so that one is "0" and the other is "1", or may be values so that "α+β" is "1". When α=0, the ratio of energy of the MDCT coefficients in the higher subbands and that of the MDCT coefficients of the noise data is calculated and the obtained ratio of energy is encoded into the extended audio encoded data stream as the gain data for the MDCT coefficients of the noise information. Furthermore, a value representing a ratio between the weighting factors α and β may be encoded. Also, when all the MDCT coefficients in one lower subband which is copied by the BWE decoding unit 902 are "0", control may be performed for setting the value of β to be "1", independently of the value of α. The noise generating unit 901 may be structured so as to hold a prepared table in itself and output values in the table as noise signal MDCT coefficients, or create noise signal MDCT coefficients obtained by the MDCT of noise signal in the time domain for every frame, or perform gain control on the noise signals in the time domain and output the noise signal MDCT coefficients using all or a part of the MDCT coefficients obtained by the MDCT of the gain-controlled noise signal.

Particularly, when the MDCT coefficients obtained by gain-controlling in the time domain the noise signal in the time domain and performing MDCT on them are used, the effect of restraining pre-echo of reproduced sound can be expected. In this case, the gain control data for controlling the gain of the noise signal in the time domain is encoded by the encoding device in the fourth embodiment in advance, and the decoding device may decode the gain control data and use it. If the decoding device structured as above is used, the effect of realizing the wideband reproduction can be expected without extremely raising the tonality using the noise signal MDCT coefficients, even if the MDCT coefficients of the lower subbands cannot sufficiently represent the MDCT coefficients in the higher subbands to be BWE-decoded.

The Fifth Embodiment

The fifth embodiment is different from the fourth embodiment in that the functions are extended so that a plurality of time frames can be controlled as one unit. Operations of the BWE encoding unit 1001 and the BWE decoding unit 1002 in the encoding device and the decoding device in the fifth embodiment will be explained with reference to FIGS. 10A~C and FIGS. 11A~C.

Figures 10A, 10B, 10C:
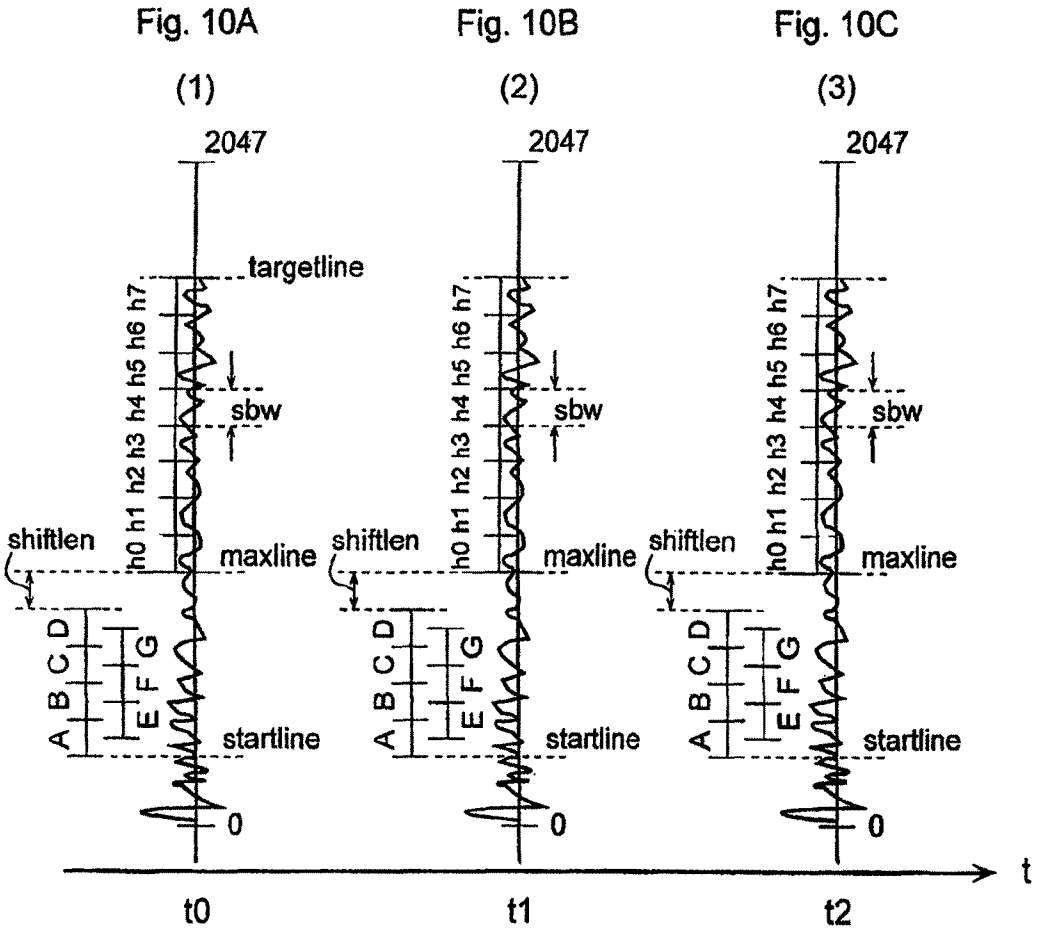
FIG. 10A is a diagram showing MDCT coefficients in one frame at the time t0.
FIG. 10B is a diagram showing MDCT coefficients in the next frame at the time t1.
FIG. 10C is a diagram showing MDCT coefficients in the further next frame at the time t2.

FIG. 10A is a diagram showing MDCT coefficients in one frame at the time t0. FIG. 10B is a diagram showing MDCT coefficients in the next frame at the time t1. FIG. 10C is a diagram showing MDCT coefficients in the further next frame at the time t2. The times t0, t1 and t2 are continuous times and they are the times synchronized with the frames. In the first through fourth embodiments, the extended audio encoded data streams are generated at the times t0, t1 and t2, respectively, but the encoding device of the fifth embodiment generates the extended audio encoded data stream common to a plurality of continuous frames. Although 3 continuous frames are shown in these figures, any number of continuous frames are applicable. In FIG. 5C of the first embodiment, the top of the extended audio encoded data stream has the item indicating whether the lower subbands A~D which are divided in the same manner as the extended audio encoded data stream in the last frame are used or not. The BWE encoding unit 1001 of the fifth embodiment also provides, in the same manner, the item indicating whether the extended audio encoded data stream same as that in the last frame is used or not on the top of the extended audio encoded data stream in each frame. The case where the higher subbands in each frame at the times t0, t1 and t2 are decoded using the extended audio encoded data stream in the frame at the time t0, for example, will be explained below.

The decoding device of the fifth embodiment receives the extended audio encoded data stream generated for common use of a plurality of continuous frames, and performs BWE decoding of each frame. For example, when the higher subband h0 in the frame is at the time t0 is substituted by the lower subband C in the frame at the same time t0, the BWE decoding unit 1002 also decodes the higher subband h0 in the frame at the time t1 using the lower subband C at the time t1, and further decodes in the same manner decodes the higher subband h0 in the frame at the time t2 using the lower subband C at the time t2. The BWE decoding unit 1002 performs the same processing for the other higher subbands h1~h7. If the encoding device and the decoding device structured as above are used, areas of the audio encoded bit stream occupied by the extended audio encoded data stream can be reduced as a whole for a plurality of the frames which use the same extended audio encoded data stream, and thereby more efficient encoding and decoding can be realized.

Figures 11A, 11B, 11C:
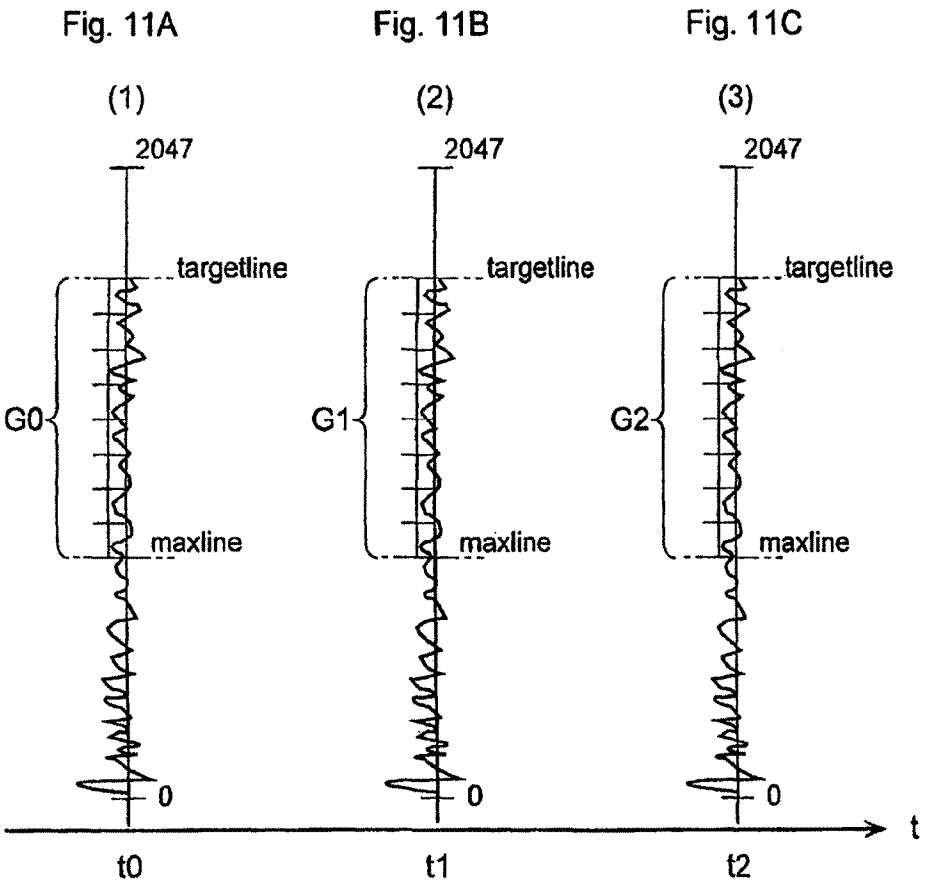
FIG. 11A is a diagram showing MDCT coefficients in one frame at the time t0.
FIG. 11B is a diagram showing MDCT coefficients in the next frame at the time t1.
FIG. 11C is a diagram showing MDCT coefficients in the further next frame at the time t2.

Another example of the encoding device and the decoding device of the fifth embodiment will be explained below with reference to FIGS. 11A~C. This example is different from the above-mentioned example in that the BWE encoding unit 1101 encodes the gain data for giving gain control, with different gain for each frame, on the higher band MDCT coefficients which are decoded using the same extended audio encoded data stream for a plurality of continuous frames. FIGS. 11A~C are also diagrams showing MDCT coefficients in a plurality of continuous frames at the times t0, t1 and t2, just as FIG. 10A~C. The other encoding device of the fifth embodiment generates relative values of the gains of the higher band MDCT coefficients which are BWE-decoded in a plurality of frames to the extended audio encoded data stream. For example, the average amplitudes of the MDCT coefficients in the bandwidth to be BWE-decoded (the higher frequency band from the "maxline" to the "targetline") are G0, G1 and G2 for the frames at the times t0, t1 and t2.

First, the reference frame is determined out of the frames at the times t0, t1 and t2. The first frame at the time t0 may be predetermined as a reference frame, or the frame which gives the maximum average amplitude is predetermined as a reference frame and the data indicating the position of the frame which gives the maximum average amplitude may separately be encoded into the extended audio encoded data stream. Here, it is assumed that the average amplitude G0 in the frame at the time t0 is the maximum average amplitude in the continuous frames where the higher band MDCT coefficients are decoded using the same extended audio encoded data stream. In this case, the average amplitude in the higher frequency band in the frame at the time t1 is represented by G1/G0 for the reference frame at the time t0, and the average amplitude in the higher frequency band in the frame at the time t2 is represented by G2/G0 for the reference frame at the time t0. The BWE encoding unit 1101 quantizes the relative values G1/G0, G2/G0 of these average amplitudes in the higher frequency band to encode them into the extended audio encoded data stream.

On the other hand, in the other decoding device of the fifth embodiment, the BWE decoding unit 1102 receives extended audio encoded data stream, specifies a reference frame out of the extended audio encoded data stream to decode it or decodes a predetermined frame, and decodes the average amplitude value of the reference frame. Furthermore, the BWE decoding unit 1102 decodes the average amplitude value relative to the reference frame of the higher band MDCT coefficients which is to be BWE-decoded, and performs gain control on the higher band MDCT coefficients in each frame which is decoded according to the common extended audio encoded data stream. As described above, according to the BWE decoding unit 1102 shown in FIGS. 11A~C, it is easy to correct the average amplitudes of the MDCT coefficients in a plurality of the frames which are decoded using the common extended audio encoded data stream. As a result, it makes possible to encode and decode with a small amount of data the audio encoded data stream which can be reproduced into a wideband audio signal with fidelity to the original sound.

The Sixth Embodiment

The sixth embodiment is different from the fifth embodiment in that the encoding device and the decoding device of the fifth embodiment transforms and inversely transforms an audio signal in the time domain into a time-frequency signal representing time change of frequency spectrum. Every continuous 32 samples are frequency-transformed at every about 0.73 msec out of 1,024 samples for one frame of audio signal sampled at a sampling frequency of 44.1 kHz, for instance, and frequency spectrums respectively consisting of 32 samples are obtained. 32 pieces of the frequency spectrums which have a time difference of about 0.73 msec for every frame of 1,024 samples are obtained. These frequency spectrums respectively represent reproduction bandwidth from 0 kHz to 22.05 kHz at maximum for 32 samples. The waveform obtained by combining the values of the spectral data of the same frequency in the time direction out of these frequency spectrums is time-frequency signals which are the output from the QMF filter. The encoding device of the present embodiment quantizes and variable-length encodes the 0th~15th time-frequency signals, for instance, out of the time-frequency signals which are the output of the QMF filter, in the same manner as the conventional encoding device. On the other hand, as for the 16th~31st higher band time-frequency signals, the encoding device specifies one of the 0th~15th time-frequency signals which is to substitute for each of the 16th~31st signals, and generates extended time-frequency signals including data indicating the specified one of the 0th~15th lower band time-frequency signals and gain data for adjusting the amplitude of the specified lower band time-frequency signal. When filtering processing is performed or a filter with a different characteristic is used depending upon a parameter, a parameter for specifying the processing details or the characteristic of the filter is described in the extended time-frequency signals in advance. Next, the encoding device describes the lower band audio encoded data stream which is obtained by quantizing and variable-length encoding the lower band time-frequency signals and the higher band encoded data stream which is obtained by variable-length encoding the extended time-frequency signals in the audio encoded bit stream to output them.

Figure 12:
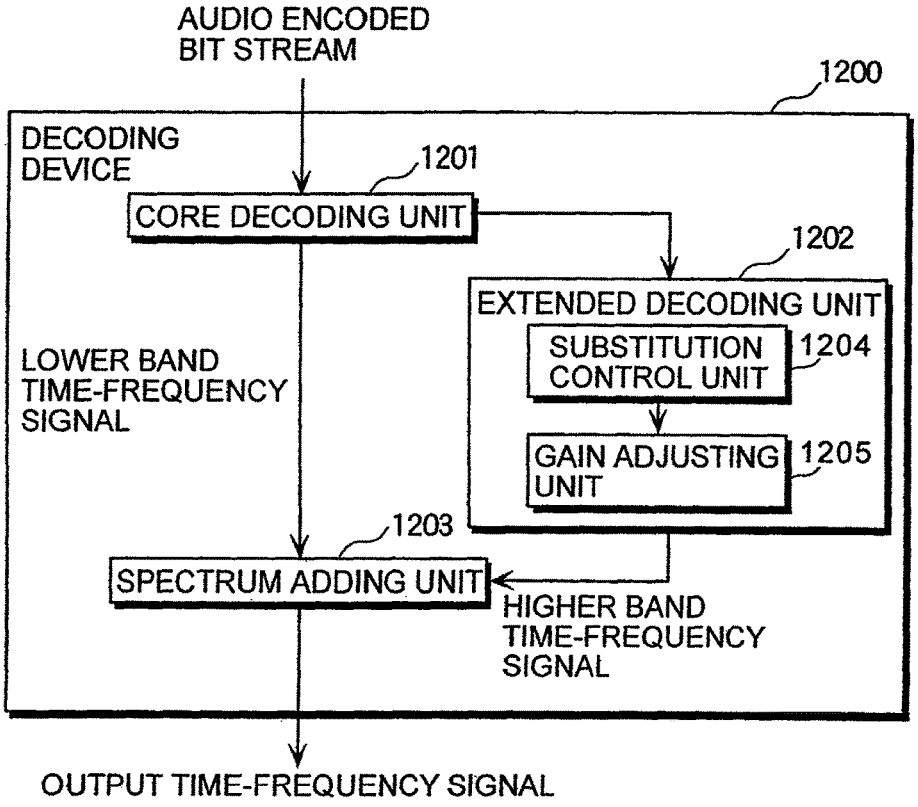
FIG. 12 is a block diagram showing a structure of a decoding device that decodes wideband time-frequency signals from a audio encoded bit stream encoded using a QMF filter.

FIG. 12 is a block diagram showing the structure of the decoding device 1200 that decodes wideband time-frequency signals from the audio encoded bit stream encoded using a QMF filter. The decoding device 1200 is a decoding device that decodes wideband time-frequency signals out of the input audio encoded bit stream consisting of the encoded data stream obtained by variable-length encoding the extended time-frequency signals representing the higher band time-frequency signals and the encoded data stream obtained by quantizing and encoding the lower band time-frequency signals. The decoding device 1200 includes a core decoding unit 1201, an extended decoding unit 1202 and a spectrum adding unit 1203. The core decoding unit 1201 decodes the inputted audio encoded bit stream, and divides it into the quantized lower band time-frequency signals and the extended time-frequency signals representing the higher band time-frequency signals. The core decoding unit 1201 further dequantizes the lower band time-frequency signals divided from the audio encoded bit stream and outputs it to the spectrum adding unit 1203. The spectrum adding unit 1203 adds the time-frequency signals decoded and dequantized by the core decoding unit 1201 and the higher band time-frequency signals generated by the core decoding unit 1202, and outputs the time-frequency signals in the whole reproduction band of 0 kHz~22.05 kHz, for instance. This time-frequency signals outputted are transformed into audio signals in the time domain by a QMF inverse-transforming filter, which will be described later but not shown, for instance, and further converted into audible sound such as voices and music by a speaker described later.

The extended decoding unit 1202 is a processing unit that receives the lower band time-frequency signals decoded by the core decoding unit 1201 and the extended time-frequency signals, specifies the lower band time-frequency signals which substitute for the higher band time-frequency signals based on the divided extended time-frequency signals to copy them in the higher frequency band, and adjusts the amplitudes thereof to generate the higher band time-frequency signals. The extended decoding unit 1202 further includes a substitution control unit 1204 and a gain adjusting unit 1205. The substitution control unit 1204 specifies one of the 0th~15th lower band time-frequency signals which substitutes for the 16th higher band time-frequency signal, for instance, according to the decoded extended time-frequency signals, and copies the specified lower band time-frequency signal as the 16th higher band time-frequency signal. The gain adjusting unit 1205 amplifies the lower band time-frequency signal copied as the 16th higher band time-frequency signal according to the gain data described in the extended time-frequency signal and adjusts the amplitude. The extended decoding unit 1202 further performs the above-mentioned processing by the substitution control unit 1204 and the gain adjusting unit 1205 for each of the 17th~31st higher band time-frequency signals. When 4 bits for specifying one of the 0th~15th lower band time-frequency signals and 4 bits for the gain data for adjusting the amplitude of the copied lower band time-frequency signal are used, the 16th~31st higher band time-frequency signals can be represented with $(4+4)\times 32=256$ bits at most.

Figure 13:
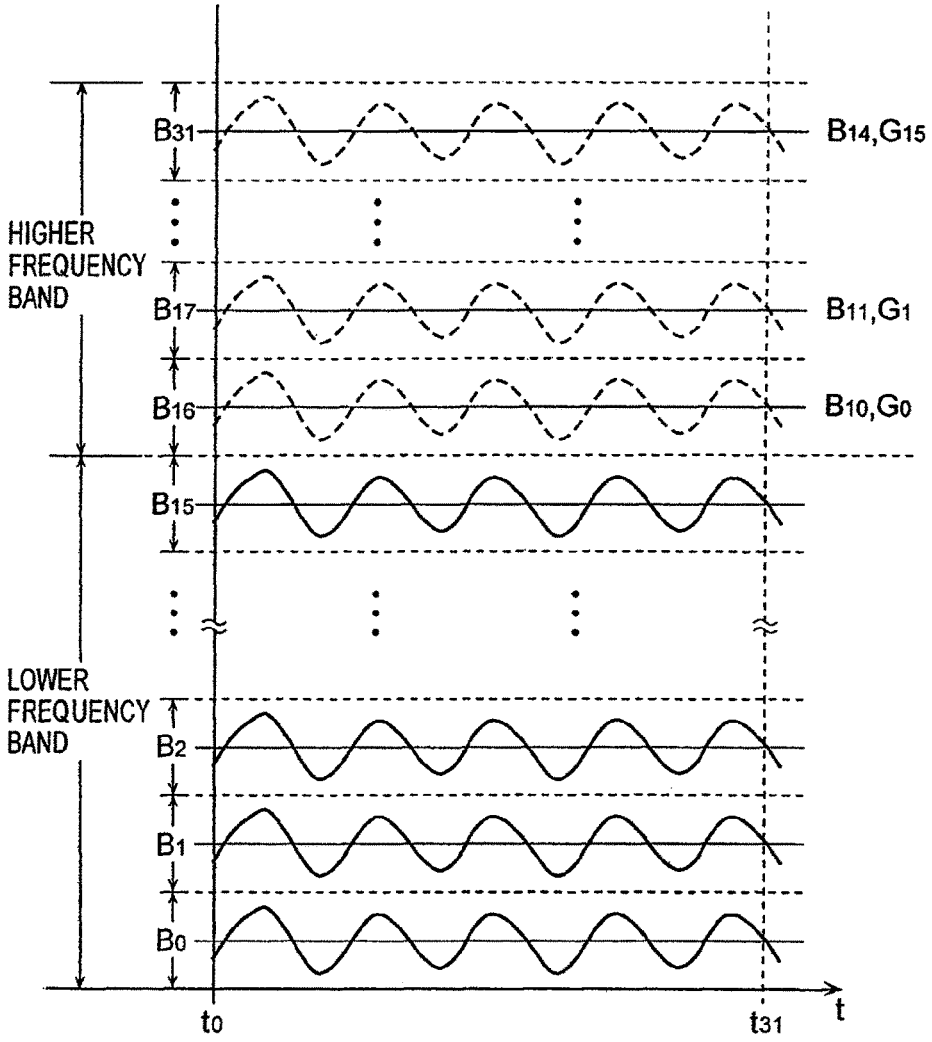
FIG. 13 is a diagram showing an example of the time-frequency signals which are decoded by the decoding device of the sixth embodiment.

FIG. 13 is a diagram showing an example of the time-frequency signals which are decoded by the decoding device 1200 of the sixth embodiment. When the spectrum of the kth lower band time-frequency signal is represented by $Bk=(pk(t0), pk(t1), \ldots, pk(t31))$ (k is an integer of $0\leq k\leq 15$), for instance, the 0th~15th lower band time-frequency signals B0~B15 quantized and encoded are described in the audio encoded bit stream which is generated by the encoding device not shown in the figure of the sixth embodiment, as shown in FIG. 13. On the other hand, as for the 16th~31st higher band time-frequency signals B16~B31, the data specifying one of the 0th~15th lower band time-frequency signals B0~B15 which respectively substitute for the 16th~31st higher band time-frequency signals and the gain data for adjusting the amplitudes of the respective lower band time-frequency signals copied in the higher frequency band are described. For example, in order to represent the 16th higher band time-frequency signal 816, the data indicating the 10th lower band time-frequency signal B10 which substitutes for the 16th higher band time-frequency signal B16 and the gain data G0 for adjusting the amplitude of the lower band time-frequency signal B10 copied in the higher frequency band as the 16th higher band time-frequency signal B16 are described in the extended time-frequency signal. Accordingly, the 10th lower band time-frequency signal B10 decoded and dequantized by the core decoding unit 1201 is copied in the higher frequency band as the 16th higher band time-frequency signal B16, amplified by a gain indicated in the gain data G0, and then the 16th higher band time-frequency signal B16 is generated. The same processing is performed for the 17th higher band time-frequency signal B17. The 11th lower band time-frequency signal B11 described in the extended time-frequency signal is copied as the 17th higher band time-frequency signal B17 by the substitution control unit 1204, amplified by a gain indicated in the gain data G1, and the 17th higher band time-frequency signal B17 is generated. The same processing is repeated for the 18th~31st higher band time-frequency signals B18~B31, and thereby all the higher band time-frequency signals can be obtained.

As described above, according to the sixth embodiment, the encoding device can encode wideband audio time-frequency signals with a relatively small amount of data increase by applying the substitution of the present invention, that is, the substitution of the higher band time-frequency signals by the lower band time-frequency signals, to the time-frequency signals which are the outputs from the QMF filter, while the decoding device can decode audio signals which can be reproduced as rich sound in the higher frequency band.

In the sixth embodiment, it has been explained that the respective lower band time-frequency signals substitute for the respective higher band time-frequency signals, but the present invention is not limited to that. It may be designed so that the lower frequency band and the higher frequency band are divided into a plurality of groups (8, for instance) consisting of the same number (4, for instance) of time-frequency signals and thereby the time-frequency signals in one of the groups in the lower band substitute for each group in the higher frequency band. Also, the amplitude of the lower band time-frequency signals copied in the higher frequency band may be adjusted by adding the generated noise consisting of 32 spectral values thereto. Furthermore, the sixth embodiment has been explained on the assumption that the sampling frequency is 44.1 kHz, one frame consists of 1,024 samples, the number of samples included in one time-frequency signal is 22 and the number of time-frequency signals included in one frame is 32, but the present invention is not limited to that. The sampling frequency and the number of samples included in one frame may be any other values.

INDUSTRIAL APPLICABILITY

The encoding device according to the present invention is useful as an audio encoding device placed in a satellite broadcast station including BS and CS, an audio encoding device for a content distribution server that distributes contents via a communication network such as the Internet, and a program for encoding audio signals which is executed by a general-purpose computer.

Also, the decoding device according to the present invention is useful not only as an audio decoding device included in an STB for home use, but also as a program for decoding audio signals which is executed by a general-purpose computer, a circuit board or an LSI only for decoding audio signals included in an STB or a general-purpose computer, and an IC card inserted into an STB or a general-purpose computer.

The invention claimed is:

[1. An encoding device that encodes an input signal comprising:

a time-frequency transforming unit operable to transform an input signal in a time domain into a frequency spectrum including a lower frequency spectrum;

a band extending unit operable to generate extension data used for specifying a higher frequency spectrum at higher frequency than the lower frequency spectrum; and an encoding unit operable to encode the lower frequency spectrum and the extension data, and output the encoded lower frequency spectrum and extension data, wherein the band extending unit generates a first parameter and a second parameter as the extension data, the first parameter is used to determine a partial spectrum which is to be copied as the higher frequency spectrum from among a plurality of the partial spectrums which form the lower frequency spectrum, and the second parameter is used to determine a gain of the partial spectrum after being copied, and wherein the band extending unit generates, as the extension data, a third parameter which is used to determine whether or not the partial spectrum to be copied is inverted on a frequency domain.]

[2. The encoding device according to claim 1, wherein the band extending unit generates, as the extension data, a fourth parameter indicating whether or not a phase of the partial spectrum to be copied is inverted.]

[3. The encoding device according to claim 1, wherein the time-frequency transforming unit is operable to perform MDCT (Modified Discrete Cosine Transform) on an input signal in a time domain into a frequency spectrum including a lower frequency spectrum.]

[4. The encoding device according to claim 1, wherein the band extending unit further generates a parameter specifying energy of a noise spectrum which is added to the higher frequency spectrum specified by the first parameter and the second parameter as the extension data, and the parameter specifying energy of a noise spectrum is an energy ratio of the noise spectrum against the higher frequency spectrum.]

[5. The encoding device according to claim 1, wherein the first parameter includes information indicating whether or not to use the same extension data as that of a preceding frame.]

[6. The encoding device according to claim 4, wherein the first parameter includes information indicating whether or not to use the same extension data as that of an immediately preceding frame.]

[7. An encoding method for encoding an input signal, comprising:

a time-frequency transforming step of transforming an input signal in a time domain into a frequency spectrum including a lower frequency spectrum;

a band extending step of generating extension data used for specifying a higher frequency spectrum at higher frequency than the lower frequency spectrum; and an encoding step of encoding the lower frequency spectrum and the extension data, and outputting the encoded lower frequency spectrum and extension data, wherein the band extending step generates a first parameter and a second parameter as the extension data, the first parameter is used to determine a partial spectrum which is to be copied as the higher frequency spectrum from among a plurality of the partial spectrums which form the lower frequency spectrum, and the second parameter is used to determine a gain of the partial spectrum after being copied, and wherein the band extending step generates, as the extension data, a third parameter which is used to determine whether or not the partial spectrum to be copied is inverted on a frequency domain.]

[8. The encoding method according to claim 7, wherein the band extending step generates, as the extension data, a fourth parameter indicating whether or not a phase of the partial spectrum to be copied is inverted.]

[9. A non-transitory computer-readable recording medium having recorded thereon an encoding program for encoding an input signal, the program causing a computer to execute the encoding method according to claim 7.]

[10. A decoding device for decoding an encoded signal, comprising:

a decoding unit operable to decode the encoded signal and to generate therefrom a lower frequency spectrum and extension data used for specifying a higher frequency spectrum at higher frequency than the lower frequency spectrum, a higher frequency spectrum generating unit operable to generate the higher frequency spectrum based on the lower frequency spectrum and the extension data; and a time-frequency transforming unit operable to transform a frequency spectrum obtained by combining the generated higher frequency spectrum and the lower frequency spectrum into a signal in a time domain, wherein the extension data includes a first parameter, a second parameter and a third parameter, and the first parameter is used to determine a partial spectrum which is to be copied as the higher frequency spectrum from among a plurality of the partial spectrums which form the lower frequency spectrum, the second parameter is used to determine a gain of the partial spectrum after being copied, and the third parameter is used to determine whether or not the partial spectrum to be copied is inverted on a frequency domain.]

[11. The decoding device according to claim 10, wherein the band extending unit generates, as the extension data, a fourth parameter indicating whether or not a phase of the partial spectrum to be copied is inverted.]

[12. The decoding device according to claim 11, wherein the time-frequency transforming unit is operable to perform MDCT (Modified Discrete Cosine Transform) of the frequency spectrum obtained by combining the generated higher frequency spectrum and the lower frequency spectrum into a signal in a time domain.]

[13. The decoding device according to claim 12, wherein, the extension data further includes a parameter specifying energy of a noise spectrum which is added to the higher frequency spectrum specified by the first parameter and the second parameter, the parameter specifying energy of a noise spectrum is an energy ratio of the noise spectrum against the higher frequency spectrum, and the higher frequency spectrum generating unit adds a noise spectrum having energy specified by said parameter specifying energy of a noise spectrum to the generated higher frequency spectrum.]

[14. The decoding device according to claim 10, wherein the first parameter includes information indicating whether or not to use the same extension data as that of a preceding frame, and the higher frequency spectrum generating unit generates the higher frequency spectrum by using the information.]

[15. The decoding device according to claim 14, wherein the first parameter includes information indicating whether or not to use the same extension data as that of an immediately preceding frame.]

[16. A decoding method of decoding an encoded signal, the decoding method comprising:

a decoding step of decoding the encoded signal to generate therefrom a lower frequency spectrum and extension data used for specifying a higher frequency spectrum at higher frequency than the lower frequency spectrum, a higher frequency spectrum generating step of generating the higher frequency spectrum based on the lower frequency spectrum and the extension data; and a time-frequency transforming step of transforming a frequency spectrum obtained by combining the generated higher frequency spectrum and the lower frequency spectrum into a signal in a time domain, wherein the extension data includes a first parameter, a second parameter and a third parameter, and the first parameter is used to determine a partial spectrum which is to be copied as the higher frequency spectrum from among a plurality of the partial spectrums which form the lower frequency spectrum, the second parameter is used to determine a gain of the partial spectrum after being copied, and the third parameter is used to determine whether or not the partial spectrum to be copied is inverted on a frequency domain.]

[17. The decoding method according to claim 16, wherein the extension data further includes a fourth parameter indicating whether or not a phase of the partial spectrum to be copied is inverted.]

[18. A non-transitory computer-readable recording medium having recorded thereon a decoding program for decoding an encoded signal, the program causing a computer to execute the decoding method according to claim 16.]

*19. A method, performed by an audio signal processing device, for processing an encoded signal, the encoded signal comprising lower frequency spectrum data and spectrum extension data, the method comprising:*

*determining a first parameter and a second parameter from the spectrum extension data of the encoded signal;*

*decoding the lower frequency spectrum data of the encoded signal to reproduce a decoded lower frequency spectrum signal;*

*generating a higher frequency spectrum signal from the decoded lower frequency spectrum signal by copying a partial spectrum signal from among a plurality of partial spectrum signals which form the decoded lower frequency spectrum signal, wherein the partial spectrum signal is indicated by the first parameter;*

*generating a gain-adjusted higher frequency spectrum signal by applying a gain indicated by the second parameter to the higher frequency spectrum signal;*

*generating a combined frequency spectrum signal by combining the gain-adjusted higher frequency spectrum signal and the decoded lower frequency spectrum signal; and*

*transforming the combined frequency spectrum signal into a time domain signal,*

*wherein one or more of the determining the first parameter and the second parameter, the decoding the lower frequency spectrum data, the generating the higher frequency spectrum signal, the generating the gain-adjusted higher frequency spectrum signal, the generating the combined frequency spectrum signal, and the transforming the combined frequency spectrum signal is implemented, at least in part, by one of more hardware elements of the audio signal processing device.*

*20. An audio signal processing device for processing an encoded signal, the encoded signal comprising lower frequency spectrum data and spectrum extension data, wherein the audio signal processing device:*

*determines a first parameter and a second parameter from the spectrum extension data of the encoded signal;*

*decodes the lower frequency spectrum data of the encoded signal to reproduce a decoded lower frequency spectrum signal;*

*generates a higher frequency spectrum signal from the decoded lower frequency spectrum signal by copying a partial spectrum signal from among a plurality of partial spectrum signals which form the decoded lower frequency decoded spectrum signal, wherein the partial spectrum signal is indicated by the first parameter;*

*generates a gain-adjusted higher frequency spectrum signal by applying a gain indicated by the second parameter to the higher frequency spectrum signal;*

*generates a combined frequency spectrum signal by combining the gain-adjusted higher frequency spectrum signal and the decoded lower frequency spectrum signal; and*

*transforms the combined frequency spectrum signal into a time domain signal,*

*wherein one or more of the determining the first parameter and the second parameter, the decoding the lower frequency spectrum data, the generating the higher frequency spectrum signal, the generating the gain-adjusted higher frequency spectrum signal, the generating the combined frequency spectrum signal, and the transforming the combined frequency spectrum signal is implemented, at least in part, by one of more hardware elements of the audio signal processing device.*

* * * * *